United States Patent [19]

Wah et al.

[11] Patent Number: 4,630,264

[45] Date of Patent: Dec. 16, 1986

[54] EFFICIENT CONTENTION-RESOLUTION PROTOCOL FOR LOCAL MULTIACCESS NETWORKS

[76] Inventors: Benjamin W. Wah, 1109 Cumberland Ave.; Jie-Yong Juang, 32-7 Hilltop Dr., both of West Lafayette, Ind. 47906

[21] Appl. No.: 652,645

[22] Filed: Sep. 21, 1984

[51] Int. Cl.$^4$ .............................................. H04J 3/02
[52] U.S. Cl. ........................................ 370/85; 370/94
[58] Field of Search ............................ 370/85, 89, 94; 340/825.5

[56] References Cited

U.S. PATENT DOCUMENTS

| | | | |
|---|---|---|---|
| 4,456,956 | 6/1984 | El-Gohary et al. | 370/85 |
| 4,516,205 | 5/1985 | Eing et al. | 370/85 |
| 4,542,501 | 9/1985 | Chevalet et al. | 370/85 |
| 4,543,574 | 9/1985 | Takagi et al. | 370/85 |

OTHER PUBLICATIONS

J. Capetanakis, "Tree Algorithm for Packet Broadcast Channels," IEEE Trans. Commun., vol. COM-26, pp. 1476-1484, Oct. 1979.

M. G. Hluchyj, Multiple Access Communication: The Finite User Population Problem, Tech. Rep. LIDS–TH-1162, Laboratory for Information and Decision Systems, Massachusetts Institute of Technology, Nov. 1981.

J. H. Hayes, "An Adaptive Technique for Local Distribution," IEEE Transactions on Communications, vol. COM-26, Aug. 1978.

L. Kleinrock and Y. Yemini, "An Optimal Adaptive Scheme for Multiple Access Broadcast Communication," Proc. ICC Conf., pp. 7.2.1–7.2.5, Jun. 1978.

J. F. Kurose and M. Schwartz, "A Family of Window Protocols for Time Constrained Applications in CSMA Networks," Proc. 2nd Joint Conference of Computer and Communication Societies (INFOCOM), pp. 405–413, 1983.

J. Mosely and P. Humblet, A Class of Efficient Contention Resolution Algorithms for Multiple Access Channels, Tech. Rep. LIDS-P-1194, Laboratory for Information and Decision Systems, Massachusetts Institute of Technology, Dec. 1982.

D. Towsley and G. Venkatesh, "Window Random Access Protocols for Local Computer Networks," IEEE Trans. on Computers, vol. C-31, No. 8, pp. 715–722, Aug. 1982.

Primary Examiner—Douglas W. Olms
Assistant Examiner—Kenneth I. Rokoff
Attorney, Agent, or Firm—Barnes & Thornburg

[57] ABSTRACT

A contention-resolution protocol on a single shared bus with asynchronous time-division multiplexing and random access is disclosed. The scheme is equivalent to finding the extremum of a set of random numbers. Each station maintains a common window. A station contending for the use of the bus generates a number. If the number generated falls in the window, the station contends in the next slot of time, otherwise it has to wait until the current contention has been resolved and a packet has been transmitted. A collision-detection rule is applied that detects whether one or more stations have contended. If more than one station has contended, or if no station has contended, a window-control rule is applied at each station to expand, shrink or otherwise change the window. The process is repeated until exactly one station has contended. The packet of data can then be sent.

54 Claims, 15 Drawing Figures

EFFICIENT CONTENTION-RESOLUTION PROTOCOL FOR LOCAL MULTIACCESS NETWORKS

The National Science Foundation contributed to the research which led to this invention (Contract No. DE-AL02-81ER10989). The government may have rights in this invention.

This invention relates to contention resolution on a single shared bus with asynchronous time-division multiplexing and random access and more particularly, to contention resolution on a bit-serial or bit-parallel bus.

In the system described, the unit of message is a packet. A station is active if it is attempting to access the channel (bus); otherwise, it is idle. Messages may have different priorities, and the bus should be granted to the station with the highest-priority message.

In a multiaccess bus, simultaneous requests for channel access can be generated by independent stations. All contending stations contend for the use of the bus synchronously. Since there is a finite transmission delay between stations, simultaneous transmissions cannot be detected until some time later that is bounded by the maximum round-trip propagation delay on the network. This time interval is a slot. When two processors try to transmit simultaneously, a collision is said to occur. The contending stations have to wait and transmit again in the future.

A bus network can be classified according to whether it is bit-serial or bit-parallel and how a collision can be detected on the bus. When two stations transmit simultaneously on a single signal line, it is possible to detect two or three states of the transmission line (bus). With a two-state collision-detection mechanism, it is possible to detect whether zero or more than zero stations have contended. On the other hand, with a three-state collision-detection mechanism, it is possible to detect whether zero, one, or more than one station has contended. A bit-serial bus with a carrier has a three-state collision-detection mechanism and has been used in carrier-sense-multiple-access (CSMA) networks. Bit-serial or bit-parallel bus networks that are used in conventional multiprocessor systems have two-state collision-detection capabilities.

In CSMA networks, an active station senses whether a carrier is present, or the network is free, before attempting to contend for the channel. If the channel is busy, the station waits until it becomes free. Otherwise, the station starts the transmission. When a message is transmitted, the originating station can detect whether there is a collision. If the transmission is terminated immediately when a collision is detected, the network is referred to as a CSMA/CD network (a CSMA network with collision detection capability).

Many protocols for point-to-point communications on CSMA/CD networks have been developed. These protocols can be classified as nonadaptive and adaptive according to their transmission policies. A nonadaptive CSMA/CD protocol makes its transmission decision regardless of the channel load. Nonpersistent and persistent protocols have been examined by L. Kleinrock and F. A. Tobagi, *IEEE Trans. Communications,* COM-23, 1400–1416 (1975). A CSMA/CD network with nonadaptive protocols has been shown to be inherently unstable by G. Fayolle, *J. ACM,* 24, 375–386 (1977). The effective throughput of the channel will tend to be zero due to the possibility of endless collisions.

In order to maintain a stable channel, an adaptive protocol is necessary. Many adaptive CSMA/CD protocols have been proposed. Notable are the Adaptive-Tree-Walk Protocol of J. Capetanakis, *IEEE Trans. Information,* IT-25, 505–515 (1979), the Urn Protocol of L. Kleinrock and Y. Yemini, *Proc. ICC,* 7.2.1–7.2.5 (1978), the Arrival-Time Window Protocol of D. Towsley and G. Venkatesh, *IEEE Trans. Computers,* C-31, 715–722, 1982, and the Binary Exponential Back-off scheme of ETHERNET as described by R. M. Metcalfe and D. R. Boggs, *Communications of ACM,* 19, 395–404 (1976). The performance of ETHERNET is load-dependent and uses a three-state collision detection mechanism. The IEEE 802 standard on CSMA/CD networks has been described by M. Graube, *IEEE Spectrum,* 19, 60–64 (1982).

Nonadaptive protocols for priority resolution have been studied by F. A. Tobagi, *IEEE Trans. Communications,* COM-30, 185–200 (1982), N. Shacham, *IEEE Trans. Communications,* COM-31, 253–261 (1983), L. M. Ni and X. Li, *Proc. Eighth Data Communications Symposium* (1983), but the adaptive protocols corresponding to these nonadaptive protocols have not been found.

CSMA/CD networks have been used in applications with load balancing. One such implementation is in the Engineering Computer Network as described by K. Hwang et al, *IEEE Computer,* 15, 55–55 (1982). The identification of the source and sink of load balancing is done inefficiently through high level operating system control and has not been embedded into the contention-resolution protocol.

Another protocol for a single shared bus with asynchronous time-division multiplexing and random access is the register insertion technique proposed by E. R. Hafner, Z. Nenadal, and M. Tschanz, *IEEE Trans. Communications* (1974) which was used in the IBM Series 1 product, *IBM Series/1 Local Communications Controller Feature Description,* GA34-0142-2 (1982). The Pierce loop implementing a slotted-ring protocol was proposed by J. R. Pierce, *Bell System Technical Journal* (1972), and later implemented in the Cambridge ring as described by P. Heywood, *Data Communications* (1981).

It is therefore an object of this invention to provide an improved contention-resolution protocol for point-to-point communications in CSMA/CD networks.

It is another object of this invention to provide a general contention-resolution protocol for point-to-point communications in CSMA/CD networks that can unify many existing CSMA/CD protocols.

It is still another object of this invention to provide an improved contention-resolution protocol for point-to-point communications in bit-serial or bit-parallel buses with two-state or three-state collision-detection mechanisms.

It is yet another object of this invention to provide an efficient protocol for identifying the set of stations that have messages with the highest priority.

It is still another object of this invention to provide an efficient protocol for identifying the station with the maximum response time and the station with the minimum response time so that load balancing can be carried out between these two stations.

It is yet another object of this invention to provide an efficient protocol for identifying one or more of a set of free resources of a given type so that they can be used to process tasks from the requesting station.

This invention provides an improved contention-resolution protocol on a single shared bus with asynchronous time-division multiplexing and random access. The scheme includes rules for generating random numbers, estimating the channel load, detecting collisions and controlling the window size accordingly. By generating a random number for each contending station at the beginning of the contention period, and successively modifying the window until exactly one station's number is isolated in the window, the contention is resolved and the packet can be sent.

Additioal features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
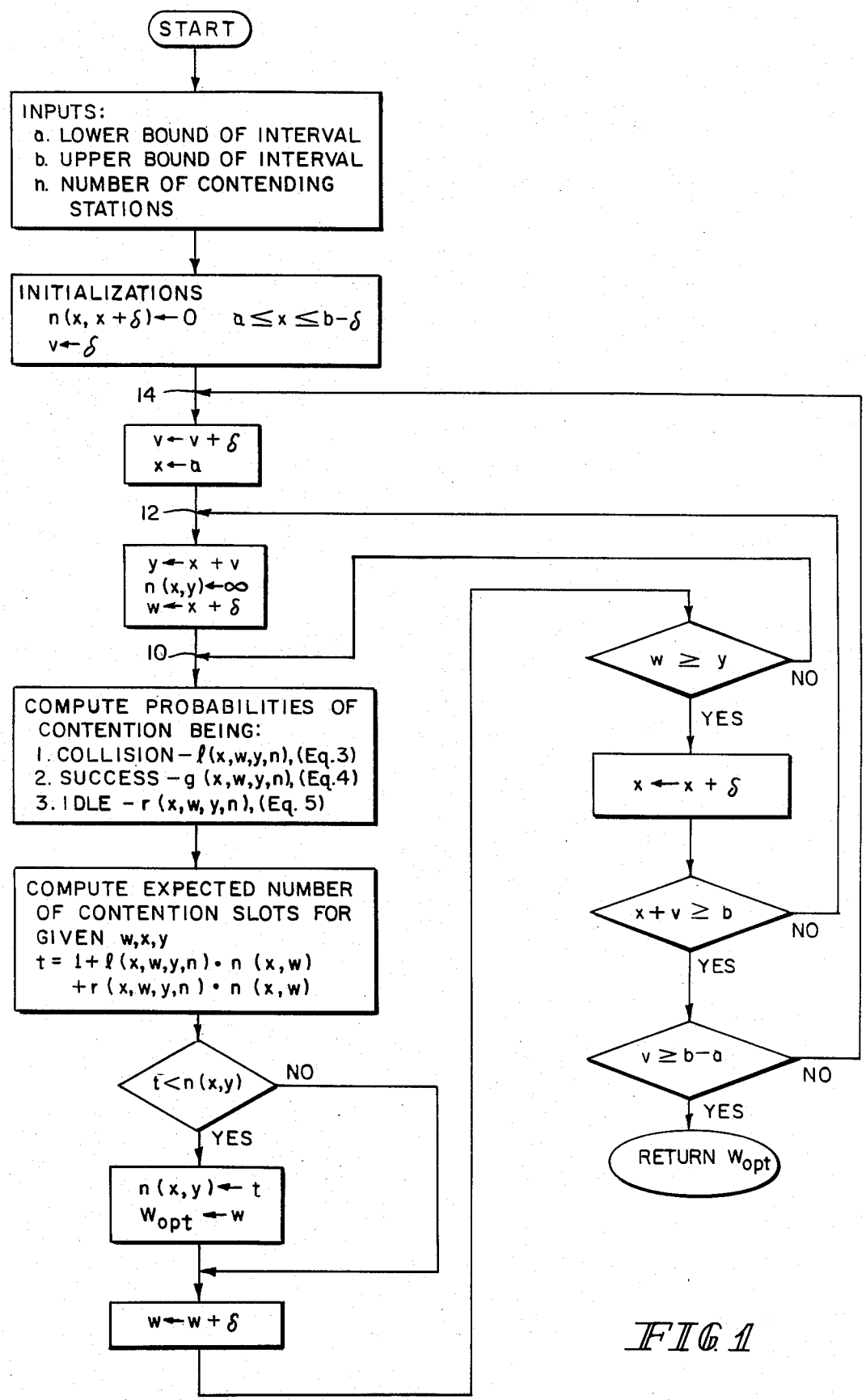
FIG. 1 is a flow diagram of a sequence of steps for a window control protocol.

To resolve contention, each contending station generates a parameter, and the station with the minimum (or maximum) parameter wins the contention. This is equivalent to finding the extrenum among a set of contention parameters. Suppose the set of contention parameters are $(x_1, \ldots, x_n)$ in the interval between L and U, and $y_i$ is the i-th smallest of the $x_j$'s. Given that the minimum value is sought, an initial interval or window is chosen with the lower bound at L and the upper bound between L and U. There can be zero, one or many $y_i$'s in this window. If there is exactly one number falling within the window, this number can be verified as the minimum, $y_1$. Otherwise, the window has to be updated: it is moved if it contains no $y_i$, or it is shrunk to a smaller size if it contains more than one $y_i$. The process is repeated until the minimum $y_i$ is uniquely isolated in the window.

An illustration of the distributed window-search scheme at station i, $1 \leq i \leq n$, on a multiaccess bus with a three-state collision-detection mechanism follows. procedure window_protocol_station_i;

```
/* procedure to find window boundaries for isolating one of
   the contending stations */
[/* window - function to calculate window size w,
   random - function to generate local contention parameter,
   estimate - function to estimate channel load,
   transmit_signal - function to send signal to bus with
     other stations synchronously,
   detect - function to detect whether there is collision
     on the bus (three-state),
   r_i - local contention parameter,
   n - estimated channel load,
   lb_window - lower bound of window to be searched
     (minimum is L),
   ub_window - upper bound of window to be searched
     (maximum is U),
   contending - boolean to continue the contention process,
   state - state of collision detect, can be collision,
     idle or success (for three-state collison
     detection). */
   lb_window : = L;
   ub_window : = U;
   r_i : = random(L,U);
   n : = estimate( );
   w : = window ( lb_window,ub_window,n);
   contending : = true;
   while (contending) do [
       if (r_i ≥ lb_window and r_i ≤ w) then [
           transmit_signal( );
           /* test for unique station in the window */
           state : = detect( ):
           if state = idle then
               lb_window : = w; /* update lower bound
                                    of window */
           else if state = collision then
               ub_window : = w; /* update upper bound
                                    of window */
           else [
               /* successful isolation of minimum */
               contending : = false;
               return (lb_window, ub_window) ]
           w : = window ( lb_window, ub_window, n) ]
       else
           contending : = false /* stop contending */
   ]
```

A global window is maintained at each station, and it serves as a reference for the transmission decision. A station is allowed to transmit if its contention parameter is inside the window.

A method of detecting the state of the channel due to the transmission is required. The state is collected by each station, and the window is updated accordingly. In a system with a two-state collision-detection mechanism, it is not possible to distinguish whether one or more than one station has contended. An additional verification phase is thus necessary. The resulting protocol called the window protocol has four major control rules:

(1) Parameter-generation rule: Each contending station generates a contention parameter that is governed by an application-dependent distribution function.

(2) Load-estimation rule: This estimates the number of contending stations before contention begins.

(3) Collision-detection rule: This detects the number of stations contending for the bus.

(4) Window-control rule: The window is updated according to outcome of collision detection. The algorithm for controlling the window is identical for all the stations, and if identical collision information is received at each station, the windows maintained by the stations will be updated identically in each step of the contention process.

The number of stations contending for the bus can be detected by a two-state or a three-state collision-detection mechanism. The load-estimation and window-control rules depend on the number of states that can be detected. The rules discussed below are based upon the fact that the distributions for generating the contention parameters are independent for all the contending stations.

Window-control schemes can be adaptive or nonadaptive to the channel load. Three load-adaptive schemes that include dynamic-programming window control, optimal greedy window control, and approximate greedy window control are described here. Two nonadaptive schemes are also described: binary-divide window control and window control based on global distributions. These control schemes are by no means exhaustive. The window control can be implemented by either table look-up or real-time calculation.

The dynamic-programming window control can be used to minimize the expected total number of contention slots before a successful transmission is possible. The following definitions are needed:

$n(a,b)$: the minimum expected number of contention slots to resolve contention given that all contention parameters are in the window $(a,U]$ and collision occurs in the current window $(a,b]$;

$g(w,a,b)$: probability of successful transmission in the next contention slot if a window of $(a,w]$, $a<w<b$, is used;

$l(w,a,b)$: probability of collision in the next contention slot if a window of $(a,w]$, $a<w<b$, is used;

$r(w,a,b)$: probability of no transmission in the next contention slot if a window is $(a,w]$, $a<w<b$, is used.

Note that:

$$l(w,a,b)+g(w,a,b)+r(w,a,b)=1 \quad (1)$$

The problem of optimizing the window control can be formulated recursively as follows:

$$n(a,b) = \min_{a<w<b} \{1 + 0 \cdot g(w,a,b) + n(a,w) \cdot l(w,a,b) + n(w,b) \cdot r(w,a,b)\} \quad (2)$$

The probabilities $g(w,a,b)$, $l(w,a,b)$ and $r(w,a,b)$ can be derived from the distributions of the contention parameters and the state of collision. When transmission is unsuccessful, it is always possible to identify a window $(a,b]$ such that at least two of the $x_i$'s lie in $(a,b]$ and no $x_i$ is smaller than a. This condition is designated as event A.

$A = \{$at least two $x_i$'s are in $(a,b]$, and all $x_i$'s are in $(a,U]\}$.

Suppose the window is reduced to $(a,w]$, $a<w<b$, in the next slot. Three mutually exclusive events corresponding to the three possible outcomes can be identified in the next slot:

$B = \{$exactly one of the $x_i$'s is in $(a,w]\}$;

$C = \{$no $x_i$ is in $(a,w]\}$;

$D = \{$more than one $x_i$'s are in $(a,w]\}$.

From these events, the probabilities can be derived as:

$$g(w,a,b) = Pr\{B|A\} = \frac{Pr\{A \cap B\}}{Pr\{A\}}$$

$$r(w,a,b) = Pr\{C|A\} = \frac{Pr\{A \cap C\}}{Pr\{A\}}$$

The event $A \cap B$ means that exactly one of the $x_i$'s is in $(a,w]$, at least one $x_i$ is in $(w,b]$, and all others are in $(w,U]$. The event $A \cap C$ means that at least two $x_i$'s are in $(w,b]$ given that all $x_i$'s are in $(w,U]$.

Let $F_i(x)$ be the distribution function for generating $x_i$, $1 \leq i \leq N$ where N is the total number of stations in the network, and n is the number of stations that are contending, then event A has the probability:

$$Pr(A) = \frac{\prod_{i=1}^{n}[1 - F_i(a)] - \sum_{i=1}^{n}\left\{[F_i(b) - F_i(a)] \cdot \prod_{\substack{j=1 \\ j \neq i}}^{n}[1 - F_j(b)]\right\} - \prod_{i=1}^{n}[1 - F_i(b)]}{\prod_{i=1}^{n}[1 - F_i(a)]} \quad (3)$$

When the protocol is being utilized for contention resolution, $F_i$ could illustratively be the Uniform Distribution Function. When the protocol is being used for load balancing, which will be discussed later, $F_i$ could illustratively be the distribution function determined by the distribution of the response times of the processors.

The first and last terms of equation (3) indicate the probabilities that all $x_i$'s are greater than a and b, respectively. The second term is the probability that exactly one of the $x_i$'s is in the window $(a,b]$. Similarly, $$g(w,a,b) = \frac{\sum_{i=1}^{n}[F_i(w) - F_i(a)] \cdot \left\{\prod_{\substack{j=1 \\ j \neq i}}^{n}[1 - F_j(w)] - \prod_{\substack{j=1 \\ j \neq i}}^{n}[1 - F_j(b)]\right\}}{Pr(A)\left\{\prod_{i=1}^{n}[1 - F_i(a)]\right\}} \quad (4)$$

-continued $$r(w,a,b) = \frac{\prod_{i=1}^{n}[1-F_i(w)] - \sum_{i=1}^{n}\left[[F_i(b)-F_i(w)] \cdot \prod_{\substack{j=1\\j\neq i}}^{n}[1-F_j(b)]\right] - \prod_{i=1}^{n}[1-F_i(b)]}{Pr(A)\left\{\prod_{i=1}^{n}[1-F_i(a)]\right\}} \quad (5)$$

It follows that an optimal window can be derived in each step of the contention process once the distributions of the contention parameters are known. However, the dynamic-programming formulation is continuous and requires infinite levels of recursion. Some boundary conditions must be set to stop the evaluation after some levels. In practice, the $x_i$'s are indistinguishable if their difference is less than $\delta$, the minimum increment of a subinterval during iteration. It is assumed that when the window size is smaller than $\delta$, the probability that two stations have generated parameters in this interval is so remote that contention can always be resolved in one step. The boundary condition is:

$n(a,b)=1$ for all $b-a<\delta$ $\delta$ was illustratively set to one-tenth of the number of contending stations in the evaluations.

Referring to FIG. 1, a flow diagram showing an illustrative sequence of steps for implementing the above-described window control procedure is shown. In the flow chart, the following definitions are used:
  v: size of a subinterval;
  $\delta$: minimum increment of subinterval during iterations;
  x: temporary lower bound of a search subinterval;
  y: temporary upper bound of a search subinterval;
  t: temporary expected number of contention slots;
  w: temporary upper bound of a window;
  $W_{opt}$: optimal upper bound of the window;
  $n(a:b-\delta,a+\delta:b)$: two-dimensional array containing the minimum expected number of contention slots expended in a search interval, each dimension is in increments of $\delta$.

In the first step, the lower bound, a, of the search interval, the upper bound, b, of the search interval, and the estimated number, n, of contending stations are input. For the first contention, a and b are L and U, respectively, and n is estimated as discussed later. The next step is the initiallization of the two-dimensional array $n(x, x+\delta)$ to zero for all of $a \leq x \leq b-\delta$. v is initialized to $\delta$. As mentioned previously, $\delta$ is a preset value and is illustratively one-tenth the estimated number of contending stations n.

In the next step, the subinterval v is increased by $\delta$ and the temporary lower bound x of the search subinterval is set to a. Proceeding to the next step, the temporary upper bound of the search subinterval is set to $x+v$, the minimum expected number $(n(x, y))$ of contention slots expended in the search subinterval $(x, y)$ is set to $\infty$ and the temporary upper bound of the window is set to $x+\delta$.

In the next step, the probabilities of a contention being a collision, successful, or idle are computed using the indicated equations. Next, the expected number of contention slots, t, for the current w, x, y are computed by using the disclosed equation.

The computer number of expected contention slots is then compared to the number of expected contention slots stored in the array location $n(x, y)$. If the computed number is less than the stored number, the sequence continues to the next step. Otherwise, the sequence skips over the next step. Assuming $t<n(x, y)$, the computed number, t, is placed in the array location $n(x, y)$ and the optimal upper bound $W_{opt}$ of the window is set equal to w.

At the next step, the temporary upper bound, w, of the window is increased by $\delta$. Proceding to the next step, the new temporary upper bound, w, of the window is compared to the temporary upper bound, y, of the search subinterval.

If $w<y$, every possible value of w in the search subinterval (x, y) has not been tested, so the program returns to point 10, where the new value of w is checked to see if it returns a lower expected number of contention slots than has already been found.

If $w \geq y$, every value of w in the search subinterval (x, y) has been checked to determine which value of w returns the least number of expected contention slots for the current search subinterval (x, y). The temporary lower bound, x, of the search subinterval (x, y) is now adjusted by incrementing it by $\delta$.

Next, the sum of the new temporary lower bound, x, plus the subinterval size, v, is compared against the upper bound, b, of the search interval to determine if all possible values for the temporary lower boundary x have been utilized in finding a w which minimizes the expected number of contention slots for the search interval (a, b) using the search subinterval size v. If $x+v<b$, the program returns to point 12 and generates a higher temporary upper boundary, y, and then retraces the steps for determining the optimum w in the new search subinterval.

If $x+v \geq b$, the size, v, of the subinterval is compared against the size, $b-a$, of the search interval to determine if every possible size of subinterval has been utilized. If $v \geq b-a$, the iterations are done and the optimal upper window boundary, $W_{opt}$ for the search interval (a, b) to minimize the expected number of contention slots has been found and is returned. Otherwise, the program returns to point 14, where the subinterval v is incremented by $\delta$, x is set equal to a, and the sequence essentially begins anew using the larger subinterval size for v.

Figure 2:
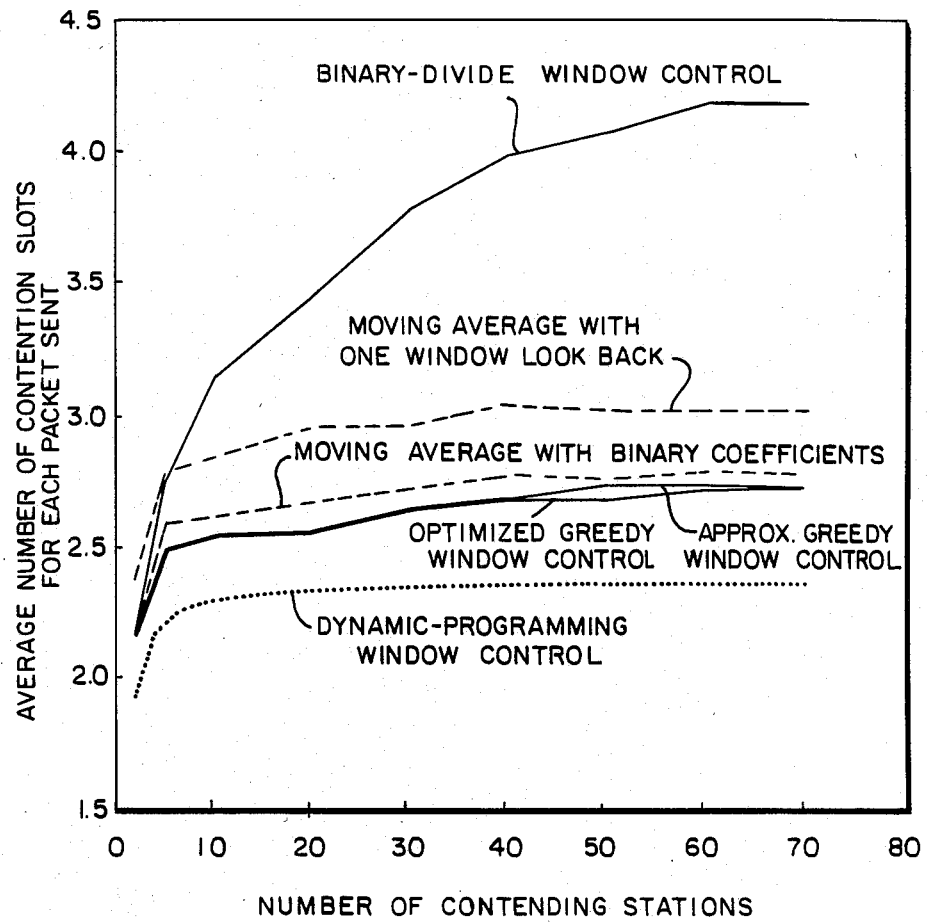
FIG. 2 is a graph showing the relative performance of different window control protocols.

FIG. 2 illustrates the performance of the window protocol for different window control and load-estimation rules in which the distribution of the contention parameters is uniform between $\emptyset$ and 1. The results of an evaluation for uniform distributions between 0 and 1 are plotted in FIG. 2. These results show that the average number of contention slots is bounded by 2.3 and is load-independent. Load independence is a desirable result which cannot be achieved by any existing protocol.

A greedy window control scheme is a scheme that maximizes the probability of success, $g(w, a, b)$, in each contention step. The scheme is an optimal greedy window scheme when an optimal window that maximizes $g(w, a, b)$ is found in each step. When the contention parameters have identical continuous distributions, F(x), g(w, a, b) can be expressed as:

$$g(w,a,b) = \frac{K[F(w) - F(a)] \cdot \{[1 - F(w)]^{n-1} - [1 - F(b)]^{n-1}\}}{[1 - F(a)]^n} \quad (6)$$

where $K=n/Pr\{A\}$. It can be shown that Equation 6 is unimodal between a and b, so a maximum exists in the window (a, b). To find the optimal value of w, $[d/(dw)][g(w, a, b)]$ is set equal to zero and solved for w. Assuming that $F(w)\neq 0$, this leads to the following:

$$[1-F(w)]^{n-1} - [1-F(b)]^{n-1} = (n-1) \cdot [F(w)-F(a)] \cdot [1-F(w)]^{n-2} \quad (7)$$

Let $z=1-F(w)$ and Equation 7 becomes:

$$z^{n-1} - \frac{(n-1) \cdot [1 - F(a)]z^{n-2}}{n} - \frac{[1 - F(b)]^{n-1}}{n} = 0 \quad (8)$$

It can be shown that a real root of Equation 8 exists and satisfies $(1-F(b)) < z_o < (1-F(a))$. There is no closed form to Equation 8, and $z_o$ has to be solved numerically. The upper boundary of the window, $w_o$, can be computed directly from $z_o$ as follows:

$$w_o = F^{-1}(1-z_o) \quad (9)$$

Figure 3:
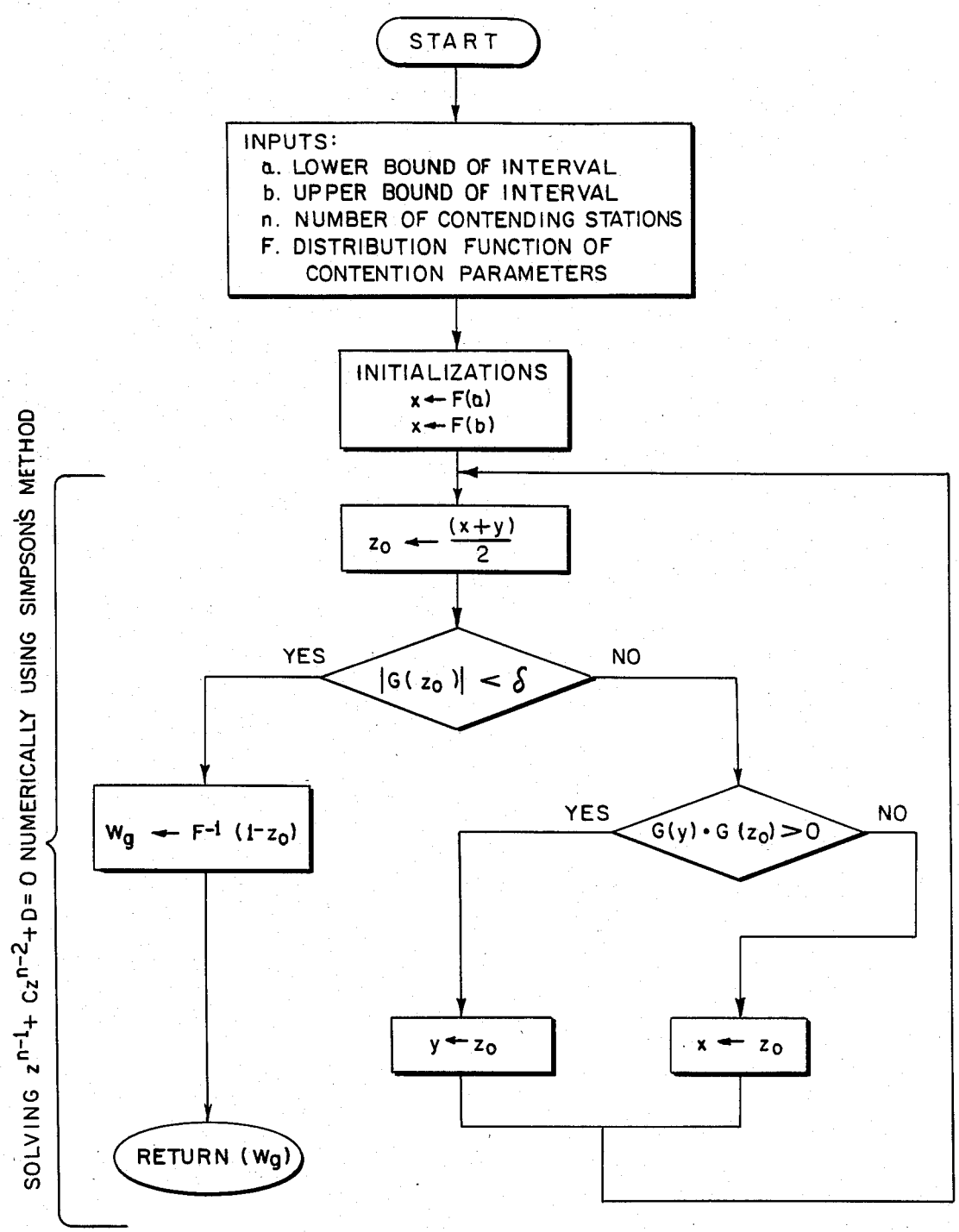
FIG. 3 is a flow diagram of a sequence of steps for a window control protocol.

Referring to FIG. 3, an illustrative flow sequence for implementing the steps for optimal greedy window control is shown. The following definitions are used in FIG. 3:

x: temporary lower bound in Simpson's algorithm;
y: temporary upper bound in Simpson's algorithm;

$$C = \frac{-(n-1)*(1 - F(a))}{n}$$

$$D = \frac{-(1 - F(b))^{n-1}}{n}$$

$$G(z) = z^{n-1} + Cz^{n-2} + D$$

δ: small constant to define the accuracy of the solution applying Simpson's method, illustratively, $10^{-6}$.

At the first step, the lower bound, a, of the interval, the upper bound, b, of the interval, and the estimated number, n, of contending stations are input in the same manner as in FIG. 1. The distribution function, F, of the contention parameters is also input. If the protocol is being used to resolve contentions, F could illustratively be the Uniform Distribution Function. If the protocol is being used for load balancing, F would be a distribution function determined by conventional statistical techniques from the distribution of the expected job response times of the various stations.

Proceding to the next step, the temporary lower bound, x, is initialized to F(a) and the temporary upper bound, y, is initialized to F(b). In the next several steps of the routine, a sequence for using Simpson's method, as discussed by C. F. Gerald in *Applied Numerical Analysis* (Addison-Wesley 1970) to solve the equation $z^{n-1}+C \cdot z^{n-2}+D=0$ is shown. These steps return a suboptimal value of, W(g), the window's upper boundary.

The performance of the optimal greedy control scheme is suboptimal and approaches 2.7 contention slots for each successful transmission (see FIG. 2).

The approximate greedy window control scheme is similar to the optimal greedy window control scheme except that an approximate solution to the success-probability equation in Eq. 6 is found. Equation 6 can be rewritten as:

$$g(w,a,b) = \frac{K \cdot [F(w) - F(a)] \cdot [F(b) - F(w)] \cdot [1 - F(w)]^{n-2} \sum_{i=0}^{n-2} v^i}{[1 - F(a)]^n} \quad (10)$$

where $v=[1-F(b)]/[1-F(w)]$. An approximation function g(w, a, b) can be obtained by substituting (n−1) for $$\sum_{i=0}^{n-2} v^i.$$

That is, $$g(w,a,b) = \frac{K' \cdot [F(w) - F(a)] \cdot [F(b) - F(w)] \cdot [1 - F(w)]^{n-2}}{[1 - F(a)]^n} \quad (11)$$

where $K'=(n-1) \cdot K$. g(w, a, b) is maximized at a position very close to that of g(w, a, b) and can be obtained by solving $[d/(dw)][\log g(w, a, b)]=0$. This results in:

$$\frac{f(w)}{F(w) - F(a)} + \frac{f(w)}{F(w) - F(b)} + \frac{(n-2) \cdot f(w)}{F(w) - 1} = 0$$

or equivalently, $$[F(w)]^2 + C[F(w)] + D = 0, \quad (12)$$

where $$C = \frac{-(n-1) \cdot [F(a) + F(b)] + 2}{n}$$

$$D = \frac{F(a) + F(b) + (n-2) \cdot F(a) \cdot F(b)}{n}$$

A solution to Eq. 12 in the interval (F(a), F(b)) is given by:

$$F(w_a) = \frac{-C - \sqrt{C^2 - 4D}}{2} \quad (13)$$

Figure 4:
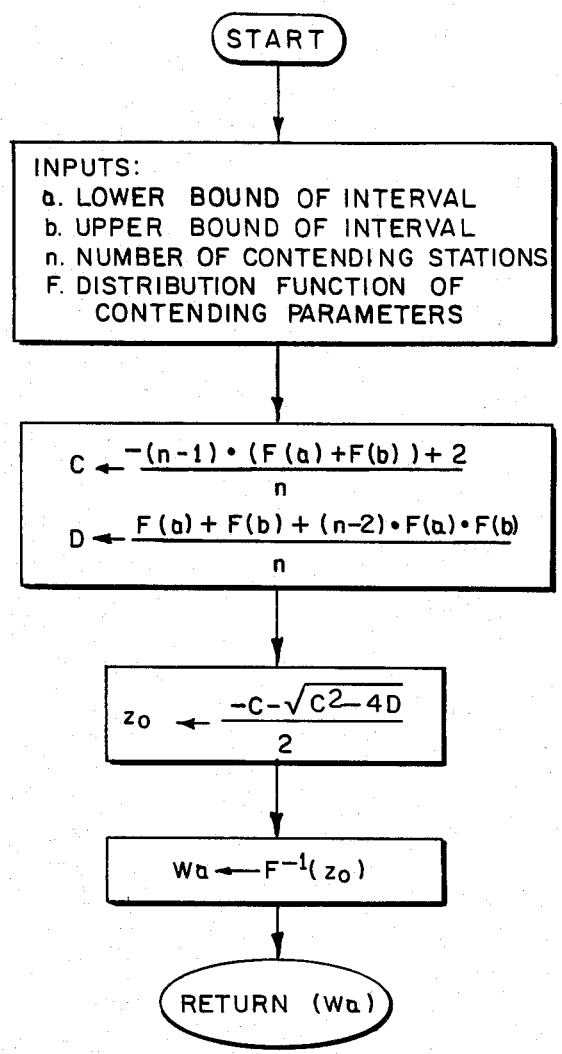
FIG. 4 is a flow diagram of a sequence of steps for a window control protocol.

Referring to FIG. 4, a flow sequence for implementing the equations for approximate greedy window control is shown. The same definitions used for FIG. 3 are also used here.

In the first step, the lower bound, a, of the interval, the upper bound, b, of the interval, the estimated number, n, of contending stations and the distribution function F of the contending parameters are input.

Proceeding to the next step, C and D are calculated by using the equations:

$$C = \frac{-(n-1) \cdot [F(a) + F(b)] + 2}{n}$$

-continued
$$D = \frac{F(a) + F(b) + (n-2) \cdot F(a) \cdot F(b)}{n}$$

C and D are variables in which the calculated values are stored. In the next step, $z_o$ is calculated using the equation $$z_o = \frac{-C - \sqrt{C^2 - 4D}}{2}.$$

$W_a$ is next calculated from the equation $W_a = F^{-1}(z_o)$. $W_a$ is the upper boundary of the window which will tend to minimize the expected number of contention slots. Although $W_a$, as determined by this routine, is suboptimal with respect to previously discussed methods, approximate greedy window control provides for a much faster method of determining $W_a$.

The approximate window, $W_a$, calculated from Eq. 13 gives a performance that is nearly as good as that of the optimal greedy window scheme (see FIG. 2).

Window control with global distribution is a scheme that uses the statistically collected distribution of the first-order statistic, $y_1$, to optimize the success probability $g(w, a, b)$. This is necessary when the distributions of the contention parameters are non-identical and are not available to all the stations. Since the optimization of $g(w, a, b)$ depends on the distributions of the first- and second-order statistics, $y_1$ and $y_2$, respectively, it is only possible to predict the probabilities of successful transmission or collision and no transmission with the information on the first-order statistic alone. The dynamic-programming formulation in Eq. 2 is reduced to:

$$n(a,b) = \min_{a<w<b} \{1 + n(a,w) \cdot l(w,a,b) + n(w,b) \cdot r(w,a,b)\} \quad (14)$$

such that $$l(w, a, b) + r(w, a, b) = 1$$

$l(w, a, b)$ in this case is the probability of successful transmission or collision. The definition of $r(w, a, b)$ remains the same as before. Using this formulation, the overhead of contentions can no longer be kept constant and is increased to $O(\log_2 n)$. However, the performance depends on the entropy of the estimated distribution. A small entropy implies less uncertainty in identifying the minimum, and thus a better performance.

A binary-divide window control scheme is derived from the optimal greedy window control scheme by setting the number, n, of contenders equal to two. When $n=2$, both of Equations 8 and 13 have the same solution, $F(w_o) = [F(a) + F(b)]/2$. If $F(y)$ is uniformly distributed over (0,1], then $w_o = (a+b)/2$. The binary-divide control rule can be used as a heuristic for window control with general distribution functions. It can be interpreted as one that always predicts that there are two contending processors. As a result, it performs satisfactorily when the channel is lightly loaded and degrades slightly when the channel load is heavy.

Figure 5:
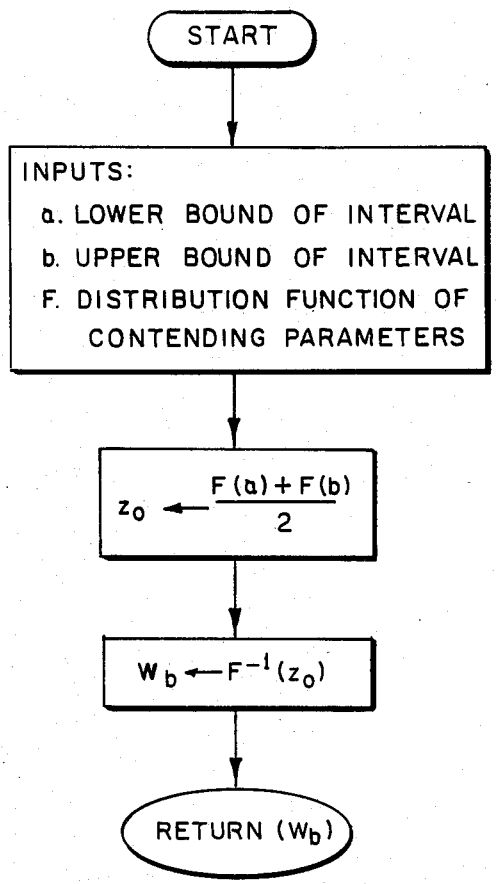
FIG. 5 is a flow diagram of a sequence of steps for a window control protocol.

Referring to FIG. 5, a flow sequence for the steps of binary-divide window control is shown. In the first step, the lower boundary, a, of the search interval, the upper boundary, b, of the search interval, and the distribution function, F, of the contending parameters are input. a, b and F are as discussed previously.

In the next step, $z_o$ is calculated using the equation $$z_o = \frac{F(a) + F(b)}{2}$$

$W_b$ is then calculated by using the equation $$W_b = F^{-1}(z_o)$$

$W_b$ is the upper boundary of the window which tends to minimize the expected number of contention slots. The performance results are illustrated in FIG. 2.

The window control schemes can be implemented by either real-time calculations or with the lookup table method. The appropriate window to be used in the next contention slot can be calculated after the result of contention in the current slot is known. However, real-time computation with dynamic programming is impractical because of the high computational complexity. For example, when $N=20$, the execution time for a dynamic-programming solution (Eq. 2) is 1.3 seconds on a Digital Equipment Corporation VAX 11/780 computer. When $N=100$, the time is increased to 828 seconds. On the other hand, in a lookup-table method, the control windows for different contending situations are precalculated and stored. During contentions, the appropriate window boundaries are retrieved according to the outcomes of previous contentions. There are two alternatives: Binary Decision Tree and Truncated Binary Decision Tree.

Figure 6A:
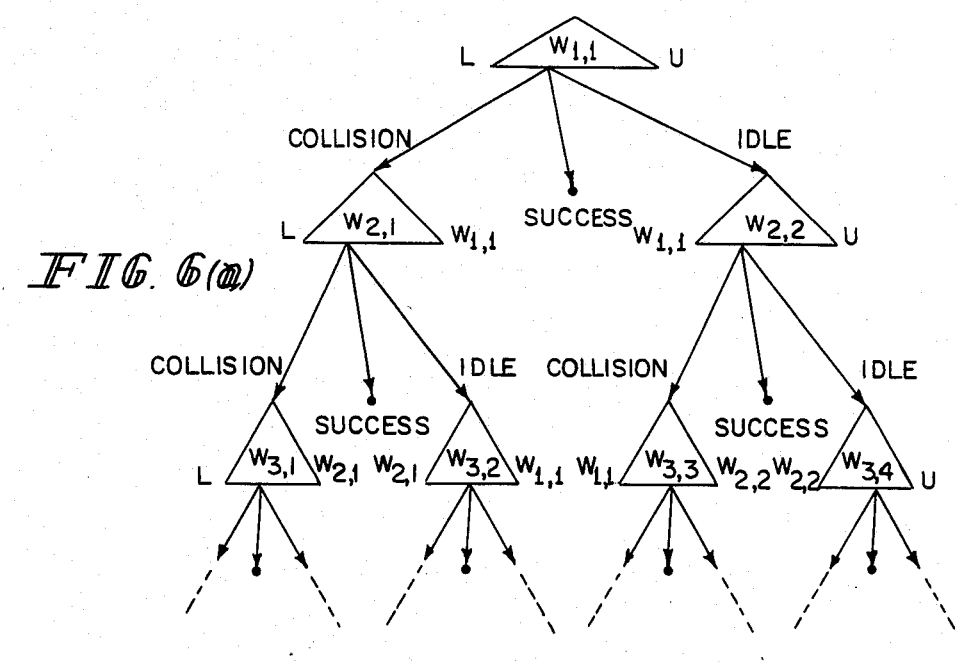
FIG. 6(a) illustrates a window search process.

Binary Decision Tree: FIG. 6(a) illustrates such a window search process. The triangle node of the tree represents the choice of window with respect to the search interval. The branches of a node represent the possible outcomes of a contention. Referring to FIG. 6(a), given a channel load n, the sequence of optimal windows derived from the dynamic window-control rules constitutes a binary decision tree. The root of a subtree represents a window. The optimal window for the next slot will reside in the left subtree if a collision is detected in the current slot. On the other hand, the optimal window for the next slot is in the right subtree if no transmission is detected. A set of binary trees, each of which corresponds to a channel load, can be constructed and stored as a lookup table in each station. The optimal window in each contention step can, therefore, be retrieved efficiently. An assigned station will be responsible for updating the trees when the distributions change.

Figure 6B:
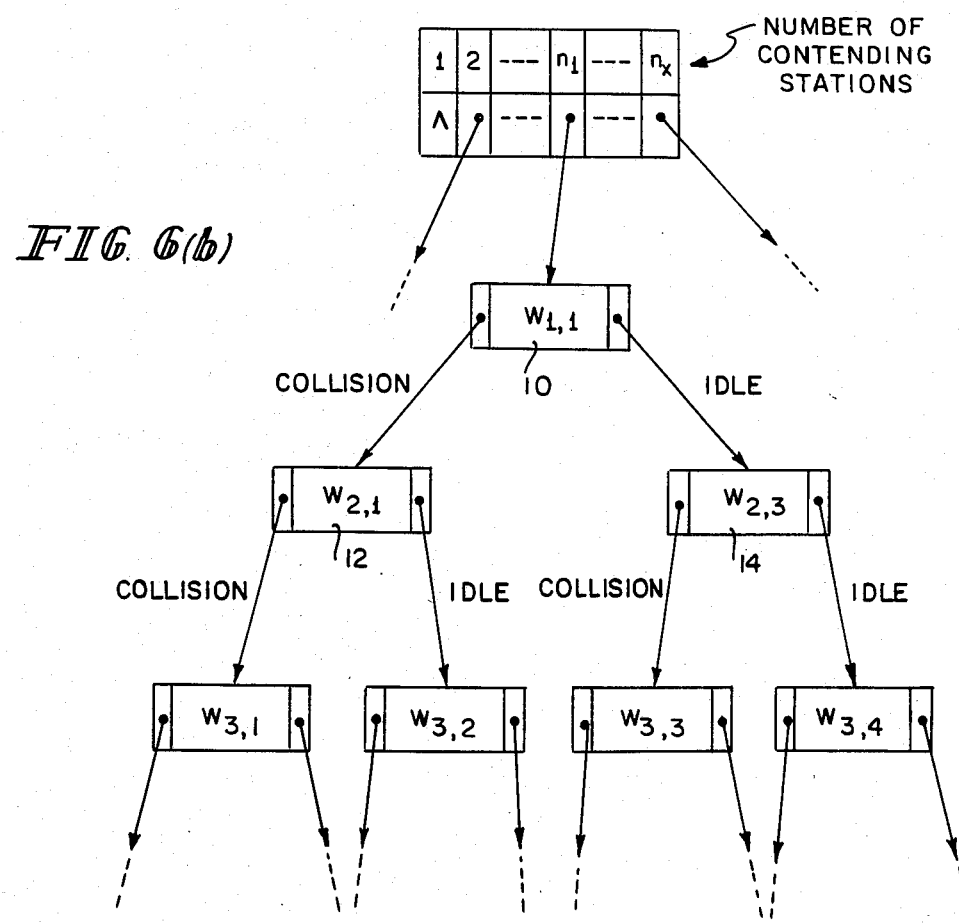
FIG. 6(b) illustrates a look-up table implementation for a window control protocol.

FIG. 6(b) illustrates the data structure for such a lookup table implementation, in which a node comprises two pointers and a window value. Contention windows $w_{i,j}$, are pre-calculated according to their corresponding search interval as shown in FIG. 6(a) and stored in the data field of the corresponding node. $n_1$ is determined as discussed later. $n_1$ is then used as a pointer into the lookup table to enable $w_{1,1}$ to be retrieved from the table as shown at 10. After the stations within the window contend, all stations determine if a collision occurred, if the contention was successful, or if no transmission occurred. If the contention was successful, the station isolated is permitted to transmit its data and the contention process begins anew.

If a collision occurs, the left pointer is used to point to another entry in the lookup table to retrieve $W_{2,1}$ as shown at 12. If no transmission occurred, i.e., an idle condition was detected, the right pointer is used to point to another entry in the lookup table and to retrieve $W_{2,2}$ as indicated at 14. The process continues until one station is isolated.

Truncated Binary Decision Tree: One problem with the binary decision-tree method is in the large memory space required. Since the average number of contention slots is small, some subtrees can be pruned to reduce the space without any significant degradation in performance. Window sizes in the pruned subtrees have to be obtained by interpolation techniques. Likewise, for those channel loads for which no decision trees are stored, interpolation has to be used to obtain the necessary windows.

The number of contending stations is estimated at the beginning of the current contention period from the distribution of the contention parameters and the statistics of previous channel activities. This information is essential in estimating an initial window and in controlling the dynamic changes in window sizes in the current contention period. Three possible methods are illustrated here.

At the end of the previous contention period $(t-1)$ when exactly one station is isolated, the window, (a, $w(t-1)$], is known to all the processors. Assuming that the load is unchanged, a maximum-likelihood estimate of the current load, $n(t)$, can be computed from a likelihood function which is the probability of success that the minimum lies in (a, $w(t-1)$]. Assuming that the contention parameters are distributed uniformly between 0 and 1, the likelihood function is derived as:

$$L(n(t), w(t-1), a) = Pr(a < Y_1 < w(t-1) < Y_2) \\ = n(t)(w(t-1) - a)(1 - w(t-1))^{n-1} \quad (15)$$

$L(n(t), w(t-1), a)$ is maximized by setting n equal to the ceiling function of $$\frac{-1}{\ln(1 - w(t-1))}$$

where $0 < w(t-1) < 1$, or:

$$n(t) = \frac{-1}{\ln(1 - w(t-1))} \quad 0 < w(t-1) < 1 \quad (16)$$

$n(t)$ is then utilized as the estimated number of contending stations in the current period, t, in the various window control schemes previously discussed. The average number of contention slots using an estimated channel load is 3.1 as shown in FIG. 2.

Since the extremum is readily available at the end of a contention period and can be "piggybacked" in the packet transmitted, an alternative estimate is based on the density function of this statistic. The conditional density of $y_1$ is $$f_{Y_1}(y | a < Y_1 < w < Y_2) = \frac{\int_w^1 f_{Y_1 Y_2}(y_1, y_2) dy_2}{\int_a^w \int_w^1 f_{Y_1 Y_2}(y_1, y_2) dy_2 dy_1} \quad (17)$$

When the distributions of the contention parameters are independent and uniformly distributed in [0,1], $$f_{Y_1 Y_2}(y_1, y_2) = n \cdot (n-1) \cdot (1 - y_2)^{n-2} \quad (18)$$

Substituting Eq. 18 into Eq. 17 gives:

$$f_{Y_1}(y | a < Y_1 < w < Y_2) = \frac{1}{w - a} \quad (19)$$

This result shows that the distribution of $y_1$ is determined once the window (a, w] is known. Therefore, no new information is gained by using the first-order statistic in the likelihood function.

The accuracy of load estimation can be improved by using information on the previous windows that successfully isolate a single station. A technique in time-series analysis called Auto-Regressive-Moving-Average (ARMA) modeling (C. Chatfield, *The Analysis of Time Series: Theory and Practice,* Chapman and Hall, London, 1975) can be used to obtain an estimated window based on previous windows. A simple example is:

$$w_{mv}(t) = \frac{(w_{mv}(t-1) + w)}{2} \quad (20)$$

in which $w_{mv}(t)$ is the accumulated information on window sizes, t is the current contention period, and w is the window in the contention period $(t-1)$ that successfully isolated a single station. Illustratively, $w_{mv}(t-1)$ is the average of all the values for the upper window boundary for the period up to and including the period $(t-1)$ and w is the upper bound of the window at the end of the previous contention period $(t-1)$. The value of $w_{mv}(t)$ is substituted for $(w(t-1))$ in Eq. 16 to estimate the channel load. The performance using ARMA load estimation is very close to that when the channel load is exactly known (FIG. 2).

Window control is also desirable for networks using a bit-parallel bus with two-state collision detection on each bit. The network supporting the protocol includes a synchronous parallel bus for transmitting data and codes, a bus-status control line for indicating the busy status of the bus, and, for each station, an intelligent interface that is capable of (a) sensing the bus-status control line, (b) reading data from the bus, (c) writing data to the bus, (d) generating random codes and (e) deciphering codes read from the bus. The time interval for generating a random number, writing the number to the bus and deciphering the code read from the bus is called a slot.

The scheme called Multiaccess Code-Deciphering (MACD) is based on the deciphering of codes to determine whether contention is allowed. To support the scheme on a bit-parallel bus, a collision-detection mechanism is needed. The Wired-OR property of the bus can be used here. That is, when two or more stations write on the bus simultaneously, the result is simply the bit-wise logical OR result of these numbers. By interpreting the result after a write, each station can determine whether a collision has occurred.

Whenever a station has data ready to transmit, it senses the bus-status line first. If the bus is in use, then the station waits until the bus is idle. To contend for the bus, a station chooses a code randomly from a given code space, S, and writes it to the bus. The size, K, of the code space, S, comprises the set of all possible distinct codes in the code space, S. If the number of bits in the code is larger than the bus width, the code is broken down into segments of size equal to the bus width starting with the most significant bit. The segments are synchronously written in sequence by all the contending stations until a non-zero code segment is read after a write. At this time, the resulting code written on the bus is the bitwise logical OR of all the code segments written by the contending stations. Each contending station reads the resulting code segment written and computes the deciphered code using a code-deciphering function. Each contending station then compares the deciphered code with the code segment it generated locally. Three outcomes may be obtained:

- the locally generated code segment is equal to the code segment read;
- the locally generated code segment is not equal to the code segment read, but is equal to the deciphered code; and
- the locally generated code segment is equal to neither the code segment nor the deciphered code.

The last outcome implies that this station has not generated the maximum code and has to wait until the next contention period. The first and second outcomes imply that this station has generated the maximum code and should be allowed to transmit. However, there may be other stations that have generated the same code. If there is more than one station in this set, a hidden collision is said to have occurred, and the contention-resolution process must be continued. There are two ways to detect a hidden collision. First, each station in this set generates an n-bit random number and writes it to the bus. To prevent the possibility of two stations generating the same random number, each station can use a distinct n-bit station-identification code as the random number. If the number read from the bus matches with the number written, then there is no hidden collision. If a hidden collision is detected, the MACD scheme is repeated. Second, we can assume that the hidden collision is not resolved, and the MACD scheme is repeated. The same process is repeated a number of times until there is a high confidence that exactly one station is isolated.

When the probability that a large number of stations have generated the maximum code is high, the second method of resolving hidden collisions is better because it is very likely that the MACD process has to be repeated, and the time for propagating the random number in the first method is saved. On the other hand, if the probability that exactly one station has generated the maximum code is high, the first method is better because hidden collisions can be detected more efficiently.

Before the scheme is described, it is assumed that there are N requesting stations, and each station writes a unary or binary random number $X_i (i=1, 2, \ldots, N)$ to the bus. The term "unary" as it is used in this application is defined as an n-bit binary number having only one "1" bit. The $X_i$s are chosen from a code space, S, with the following properties:

$$X_i, X_j \epsilon S, i \neq j, \text{ are related, i.e. } X_i > X_j \text{ or } X_i < X_j \quad (21)$$

$$f(X_1 \oplus X_2 \oplus \ldots \oplus X_N) \leq \max \{X_1, X_2, \ldots X_N\} X_i \epsilon S, \quad N \geq 1 \quad (22)$$

where $\oplus$ is the bitwise logical OR operator. By reading data on the bus and applying the code-deciphering function, f, a station knows the maximum number written on the bus. This information provides a basis for the window control.

To show that there exists a code space of n bits in the unary representation that satisfies Equations 21 and 22, let $S = \{0^a 1 0^b | a+b=n-1, a \geq 0, b \geq 0\}$ where $0^k$ represents a consecutive sequence of k zeros. For any n-bit unary number, $X = (x_1 x_2 \ldots x_n)$, a deciphering function f on X can be defined such that:

$$f(X) = 0^p 1 \, 0^{n-p-1}, \text{ if } x_{p+1}=1, x_j=0 \text{ for all } 0 \leq j \leq p < n$$

It is easy to verify the relatedness property of Equation 21 for any two different elements u and v in S. To verify Equation 22, N codes are chosen randomly from S and, $$c_i = 0^{a(i)} 1 \, 0^{n-a(i)-1}, i=1, \ldots, N, a(i) < n$$

By definition of S, $$c_i \epsilon S,$$

and $$\max (c_1 c_2 \ldots, c_N) = 0^m 1 \, 0^{n-m-1}$$

where $m = \min \{a(i) | i=1, 2 \ldots, N\}$. An overlapped variable $Y = (y_1 y_2 \ldots y_n)$ is defined to be the bitwise logical OR of the $c_i$'s, i.e., $$(y_1 y_2 \ldots y_n) = c_1 \oplus c_2 \oplus \ldots \oplus c_N.$$

Y, as defined, retains the following properties:

$$y_{m+1} = 1,$$

and $$Y_k = 0 \text{ for all } k \leq m.$$

By definition of the deciphering function, f, $$f(Y) = 0^m 1 \, 0^{n-m-1}$$

or $$f(c_1 \oplus c_2 \oplus \ldots \oplus c_N) = \max (c_1, c_2 \ldots, c_N).$$

Given the mechanisms for detecting collisions, and the code space, the important design issue is the control of the window. Two schemes are described here.

Load-Dependent Code-Deciphering Window Control with Unary or Binary Codes is a scheme based on a bit-parallel bus of width W and a code space of size K=W, W<1. If a bit-serial bus is used, (W=1), a large code space of size K>1 should be used, and the code generated has to be sent serially. Since the size of the code space is equal to the bus width, the maximum code generated is always included in the first write. A collision-detection procedure can be applied, and the maximum can be isolated eventually. An illustrative routine for the basic steps in each station contending for a bit-parallel bus with two-state collision detection and a load dependent code-deciphering scheme follows:

--- procedure load_dependent_code_deciphering_station_i;
    /* procedure to decide whether station i can transmit */
    [/* random (w) - function to generate local unary code
       of w bits,
       transmit_receive (a,b) - function to write code
       a to bus with other stations synchronously,
       and to read the resulting code, b, written
       on bus,
       decip(y) - code-deciphering function for y,
       station_id - unique station-identification code
       for this station,

```
-continued
W - width of bus,
r_i - local contention parameter,
y - code read from bus,
contending - boolean to continue the contention
  process,
sucess - boolean to indicate whether station i is
  granted the bus */
r_i := random (W);
contending := true;
success := false;
while (contending) do [
        /* transmit code and compare with code read */
        transmit_receive (r_i, y);
        if (r_i<decip(y)) then
        contending := false
        else [ /* verify that a single station has
          transmitted */
        transmit_receive (station_id, y);
        if (y = station_id) then [
          success := true;
          contending := false ]
        else
          r_i := random (W);
        ]
]
        return (success)
]
```

The time complexity of contention resolution can be measured by the mean number of contention slots in each contention period. To analyze this complexity, let N be the number of contending stations at the beginning of a contention period and K to be the size of the code space. In the load-dependent scheme, K is equal to the bus width, W. Assuming that the codes are chosen randomly, then a station generates a given code $c_i$ (i=1, 2, ..., N) with probability 1/K. Designating the maximum of N such $c_s$'s as $c_m$, the mth code in the code space, $c_m$, =max $\{c_i | i=1,2, ..., N\}$. If exactly one station generates a code $c_m$ and other stations generate codes less than $c_m$, then the contention is resolved. The probability for this event to occur is:

$$q(m|N,K = W) = N \cdot \left[\frac{1}{K}\right] \cdot \left[\frac{m-1}{K}\right]^{N-1} \quad (23)$$

Since m ranges from 1 to K and these K events are mutually exclusive, the probability that contention is resolved in one step is $P_{K,W,N}$ where K=W is:

$$P_{K,W,N} = \sum_{m=1}^{K} q(m|N,K = W) \quad (24)$$

$$= \sum_{m=1}^{K} N \cdot \left[\frac{1}{K}\right] \cdot \left[\frac{m-1}{K}\right]^{N-1}$$

$$= \frac{N}{K^N} \sum_{u=1}^{K-1} u^{N-1}$$

Figure 7:
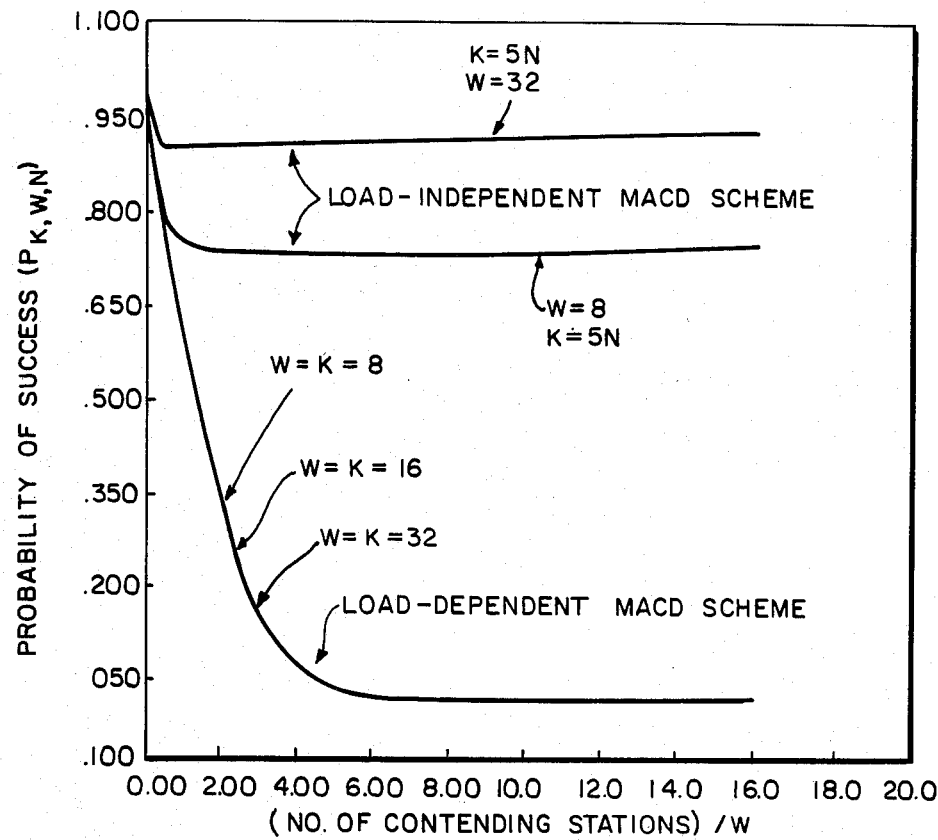
FIG. 7 is a graph illustrating the probability of success in one contention using a multiaccess code-deciphering bus-arbitration scheme.

FIG. 7 illustrates the probability of success in one contention using a Multiaccess Code-Deciphering bus-arbitration scheme wherein K is the size of the code space, W is the bus width, and N is the number of contending stations. $P_{K,W,N}$ is plotted against N/W. it can be seen that the probability of success in one contention is higher if the code space (equals bus width, W) is larger for a constant number, N, of contending stations. It is observed that $p_{K,W,N}$ is a strictly decreasing function of N and decreases to zero when N is very large. In other words, the MACD scheme is unable to resolve contention in one step when the load is extremely heavy. However, most of the contending stations are eliminated in one attempt. The number of survivors is reduced significantly as contention proceeds, and the probability of success is consequently increased. The following analysis demonstrates this phenomenon.

Let it first be assumed that the maximum of the codes generated by the contending stations is $c_m$, the mth code in the code space. There are then indicator variables $x_i$, i=1, ..., N, $$X_i = \begin{cases} 1 \text{ with probability } 1/m \\ 0 \text{ with probability } 1 - 1/m \end{cases}$$

Let $$Z = \sum_{i=1}^{N} X_i.$$

The random variable Z indicates the number of stations that generate $c_m$ in the contention. These stations are allowed to contend in the following steps. The expected value, E(Z|m,N,W), of Z given m, N and W, represents the average number of surviving stations. It is easy to show that:

$$E(Z|m,N,W = K) = \frac{N}{m} \quad (25)$$

Furthermore, the probability P(m|N,W=K), that the current maximum code, $c_m$ with N contending stations and a code space of K can be expressed as:

$$p(m|N,W = K) = \left(\frac{m}{K}\right)^N - \left(\frac{m-1}{K}\right)^N. \quad (26)$$

The expected number of stations that would survive a contention is:

$$E(Z|N,W = K) = \sum_{m=1}^{K} E(Z|m,N,W = K) \cdot p(m|N,W = K) \quad (27)$$

$$= \sum_{m=1}^{K} \left(\frac{N}{m}\right) \cdot \left[\left(\frac{m}{K}\right)^N - \left(\frac{m-1}{K}\right)^N\right]$$

$$= \left[\left(\frac{N}{1} - \frac{N}{2}\right) \cdot \left(\frac{1}{K}\right)^N\right] +$$

$$\left[\left(\frac{N}{2} - \frac{N}{3}\right) \cdot \left(\frac{2}{K}\right)^N\right] + \ldots + \left[\left(\frac{N}{K-1} - \frac{N}{K}\right) \cdot \left(\frac{K-1}{K}\right)^N\right] + \left[\frac{N}{K} \cdot \left(\frac{K}{K}\right)^N\right]$$

$$= \frac{N}{K^n} \cdot \left(\frac{1^{N-1}}{2} + \frac{2^{N-1}}{3} + \ldots + \right.$$

-continued $$\left. \frac{(K-1)^{N-1}}{K} \right\} + \frac{N}{K}$$

$$\leq \frac{N}{K^N} \cdot \left\{ K \cdot \frac{(K-1)^{N-1}}{K} \right\} + \frac{N}{K}$$

$$\leq \frac{N}{K} \cdot \left( \frac{K-1}{K} \right)^{N-1} + \frac{N}{K}$$

$$\leq \frac{2N}{K}$$

The ratio $$v = \frac{E(Z|N, W = K)}{N} \leq \frac{2}{K}$$

is a measure of the average fraction of contending stations that can survive a contention. Let $N_t (t=0,1,\ldots)$ be the expected number of contending stations in step t. By Eq. 27, we have $$N_t \leq \left( \frac{2}{K} \right)^t \cdot N_0 \quad t \geq 0$$

Therefore, $N_t$ approaches 1 as t approaches $\log_{K/2}(N_0)$ (28)

Figure 8:
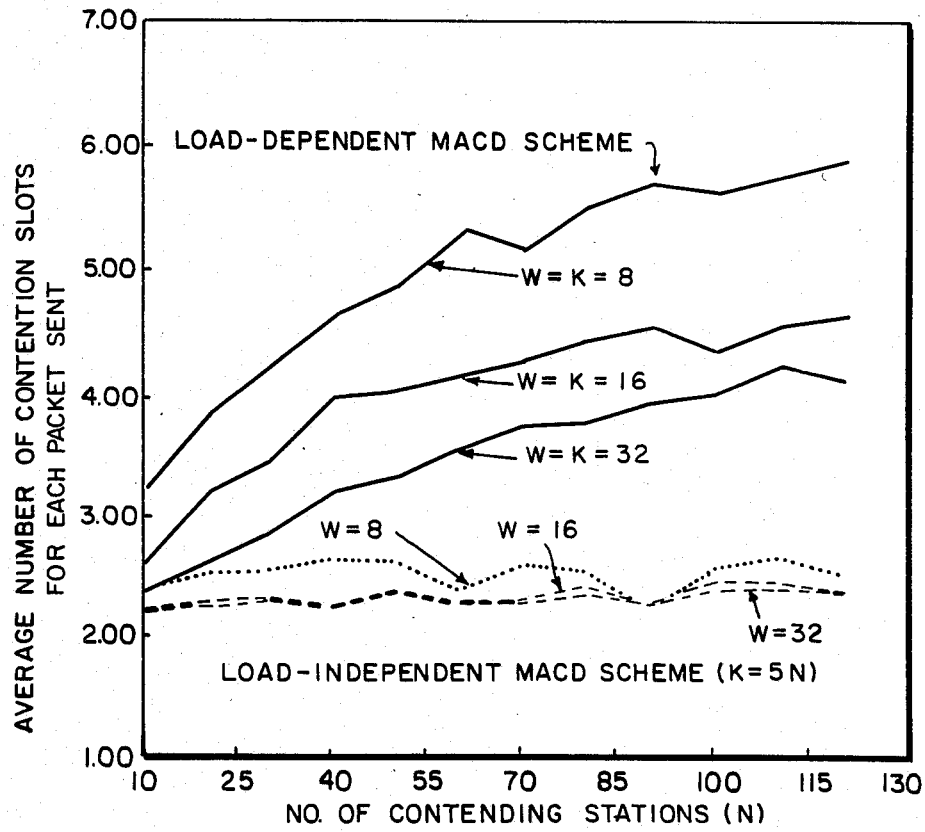
FIG. 8 is a graph illustrating the average number of contention slots needed for resolving conflicts of bus requests using a multiaccess code-deciphering scheme.

Referring to FIG. 7, $P_{K,W,N}$ approaches 1 as $N < K = W$, and $P_{K,W,N}$ approaches 0 as $N >> K = W$. This fact reveals that the contention process of the load-dependent scheme can approximately be divided into two phases. The effect of the first phase, i.e., when $N_t > K = W$, is to reduce the number of contending stations. When the process enters the second phase, i.e., $N_t \leq K = W$, contention can be resolved in about one step. The overall contention process will stop within an average of $\log_{K/2}(N_0)$ steps. FIG. 8 shows the simulation results that confirms this analysis. FIG. 8 illustrates the average number of contention slots for resolving conflicts of bus requests using the Multiaccess Code-Deciphering scheme where K is the size of the code space, W is the bus width and N is the number of contending stations. The number of contention slots shown includes the additional slots required for resolving hidden collisons. MACD performs better when the bus width is large.

As shown in Equation 28 and FIG. 8, the scheme just discussed is load-dependent and performs well when the bus width is large and the number of contending stations is small. Since the number of contention slots grows logarithmically with the number of contending stations, the scheme is inefficient when the number of contending stations is large or the bus width is small.

The cause for the load-dependency is due to the fixed window control on a fixed code space. Since the window is fixed by the bus width, the code space can be designed so that it is a function of the number of contending stations and the bus width. This will reduce the number of stations contending in a slot. By choosing the size, K, of the code space, S, so that the number of stations contending in a slot is a relatively small constant as compared to the bus width, contention can be resolved in a time that is independent of load.

The solution depends on choosing the size of the code space and estimating the number of contending stations. Suppose N can be estimated accurately, and $K/N = r$. The probability that contention is resolved in one step (referring to Equation 24) is:

$$P_{K,N,W} = \sum_{m=K-W+1}^{K} q(m|N = K/r, K, W) \quad (29)$$

$$= \frac{N}{(N \cdot r)^N} \sum_{u=K-W}^{K-1} u^{N-1}$$

where $q(m|N=K/r,K,W)$ is defined in Equation 23. The value of $P_{K,N,W}$ is plotted in FIG. 7. It is seen that the probability of success is higher and load-independent as a result of the increase in the size of the code space.

The expected number of stations that would survive a contention can also be derived similarly. In this case, the number of surviving stations is N if no station contends in the slot. Equation 25 becomes:

$$E(Z|m,N = K/r,W) = \begin{cases} \frac{N}{m} K \leq m \leq K - W + 1 \\ N \quad 1 \leq m \leq K - W \end{cases} \quad (30)$$

The definition of $p(m|N,W)$ in Equation 26 remains true. The expected number of surviving stations in one contention is:

$$E(Z|N = K/r, W) = \sum_{m=1}^{K} E(Z|m,N = K/r, W) \cdot p(m|N = K/r, W) \quad (31)$$

$$= \sum_{m=K-W+1}^{K} \frac{N}{m} \cdot p(m|N = K/r, W) +$$

$$\sum_{m=1}^{K-W} N \cdot p(m|N = K/r, W)$$

$$\leq \frac{2N}{K} + \left[ \left( \frac{K-W}{K} \right)^N - \left( \frac{K-W-1}{K} \right)^N \right] \cdot (K - W)N$$

Since $K/N=r$, a constant, $E(Z|N=K/r, W)$ is a constant independent of load if K is large as compared to W.

Figure 9:
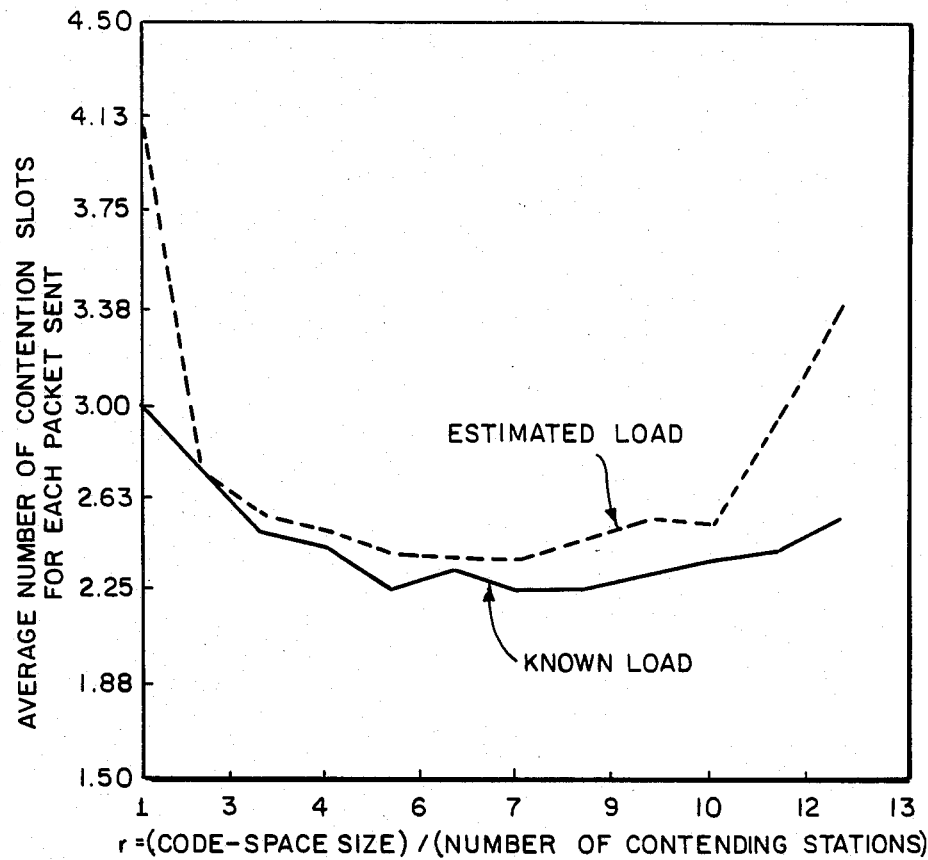
FIG. 9 is a graph illustrating an optimal choice of code-space size.

The correct choice of r is shown in FIG. 9. There is an optimal choice of r so that the number of contention slots is minimum. The optimal choice of r is experimentally determined for a particular configuration. The optimal value depends on the value of W and is load-independent, assuming that N is known. The value is approximately 5 for the combinations of W and N tested. Using the optimal value of r, the performance of the load-independent MACD scheme is plotted in FIG. 8. In generating these results, the size of the code space, K, is chosen to be W if r·N is smaller than W. That is, the load-dependent MACD scheme is used when the load is light. It is observed that the load-independent scheme requires a small constant number of slots when the load is heavy. An illustrative procedure is set forth as follows:

```
procedure load_independent_code_deciphering_station_i;
    /* procedure to decide whether station i can transmit */
    [/* random (w) - function to generate local unary code of
        w bits,
        transmit_receive (a,b) - function to write code a to
            bus with other stations synchronously, and to read
            the resulting code, b, written on bus,
        receive(b) - read code b written on bus,
        decip(y) - code-deciphering function for y,
        trunc(y) - function to truncate fractional part of y,
        station_id - unique station-identification code for
            this station,
        W - width of bus,
        K - size of code space,
        N - estimated number of contending stations,
        r - experimentally determined constant that is equal
            to the ratio of code space and channel load,
        $r_i$ - local contention parameter,
        y - code read from bus,
        l - lower bound of sub-code-space to be considered,
        u - upper bound of sub-code-space to be considered,
        t - truncated code of $r_i$ to W bits,
        finding - boolean to indicate whether contention
            process is finished,
        contending - boolean to continue the contention process,
        success - boolean to indicate whether station i is
            granted the bus */
    K := N*r;
    $r_i$ := random (K);
    l := $2^{K-W-1}$;
    u := $2^{K-1}$;
    finding := false;
    success := false;
while (not finding) do [
        /* transmit truncated code of $r_i$ if in range, t is
            obtained by extracting W bits of $r_i$ starting from
            the most significant bits */
        t := trunc(($r_i$-trunc($r_i$/(2u))*2u)/(2l));
        if (t>0) then
                transmit_receive( t,y);
        else
                receive(y);
        if (decip(y) = 0) then [
                /* no station transmits, move code space by
                    W bits */
                u := u/$2^W$;
                l := 1/$2^W$ ]
        else [
                /* there exists a station with code in the
                    sub-code space */
                finding := true;
                contending := true;
                /* resolve contentions using load-dependent
                    scheme */
                while (contending) do [
                        if (t<decip(y)) then
                            contending := false
                        else [/* verify that a single station has
                            transmitted */
                                transmit_receive (station_id, y);
                                if (y = station_id) then [
                                    success := true;
                                    contending := false ]
                                else
                                    t := random (W);
                        ]
                        if (contending) then
                            transmit_receive (t,y);
                ]
        ]
    ]
    return (success)
]
```

It is necessary to estimate the channel load in the current contention period, t, in the load-independent MACD scheme. A reasonable estimate of (N(t)) can be obtained by:

$$N(t) = \frac{B(t-1) \cdot K(t-1)}{W} \tag{32}$$

where B(t−1) is the number of bits that are ones in the previous contention period (t−1), K(t−1) is the total number of bits in the code space of size K for the previous contention period (t−1) and W is the width of the bus, i.e., the number of bits wide the bus is. This will systematically under-estimate the actual value of N(t), and some correction to the value of r used should be introduced.

FIG. 9 illustrates the optimal choice of the code-space size where W equals 16 and N equals 60. In FIG. 9, the optimal value of r that should be used is slightly different when the estimate in Equation 32 is used. The number of contention slots required is slightly increased when N is estimated.

Due to random noises and component failures, the collision-detection mechanism may fail to detect the presence or absence of collisions at a particular station. When different collision information is received by different contending stations, the window will be updated differently and will not be synchronized. This may result in indefinite contentions or another contending station besides the one having the extremum winning the use of the channel. A solution to this problem is to restart the contention process whenever: (1) contention has not been resolved after a threshold number of contention slots; or (2) a contending station does not agree with the extremum of the winner in the contention process. In the second case, the extremum is broadcast after a winner is found. Any station that does not agree with the winner can introduce further collisions in the network so that the contention process can be restarted. In case the process is restarted frequently, a network failure will be reported.

As can be appreciated from the foregoing, this invention provides an improved collision-detection protocol that is particularly useful in bit-serial and bit-parallel bus systems. The implementation of the contention-resolution protocol can be in hardware, software or firmware.

A contention parameter used in the contention-resolution protocol can be either of discrete type or of continuous type. Distributions governing the generation of such contention parameters may be either identical or nonidentical, but should be independent of each other. The generation of contention parameters with identical distributions usually simplifies the window controls. A contention parameter, $X_i$, generated by a continuous distribution, $F_i(\cdot)$, can be transformed into another contention parameter, $X'_i$, that is uniformly distributed over (0,1) by the following equation, as described by Papoulis in *Probability, Random Variables, and Stochastic Processes*, McGraw Hill, N.Y., 1965:

$$X'_i = F_i(X_i) \tag{33}$$

The generation of parameters with nonidentical distributions can thus be mapped to those with identical uniform distributions. This transformation is a one-to-one mapping and the window control as performed on the transformed contention parameters can be shown to be equivalent to that applied to the original parameters. Although, some properties are not preserved after the transformation, the efficiency of the contention resolution is not affected.

A window control scheme is designed to reduce the contention overhead by reducing the number of contentions. Any distributed algorithm that produces synchronized windows in the process of contention can be used as a window control scheme. Since the contention parameters are generated randomly, there are uncertainties in isolating the minimum. A good window control scheme will use the more available information in predicting the position of the minimum. This information includes channel load, distributions of contention parameters, and statistics collected from channel activities. The performance of a window protocol depends on the way that this information is utilized.

For a bit-parallel bus, any code space and deciphering function that satisfy the properties of Equations 21 and 22 are suitable for code-deciphering window control.

The channel load can be estimated from statistical information collected in the window protocol, and a separate estimation mechanism is not needed. Load estimation methods for the window protocol include any inference method based on distributions and/or dynamic information collected from channel activities.

The window protocol works independently of the collision-detection mechanisms. It can be implemented on any bus that has a three-state collision-detection capability. This includes three-state bit-serial buses and two-state bit-parallel buses. In a two-state collision-detection mechanism, an additional verification phase must be added to simulate a three-state mechanism.

The contention-parameter-generation mechanism of the window protocol can be implemented either explicitly or implicitly. The efficiency of any contention-resolution protocol that can be unified into the window protocol can be optimized by the disclosed window-control scheme. This is done by identifying the protocols' implicit contention parameters and the corresponding distribution functions. Three existing adaptive CSMA/CD protocols are demonstrated below to show the application of the window control to improve their performance. The contending parameters for the first two protocols are discrete, while those of the last one are continuous.

The Adaptive-Tree-Walk Protocol was proposed by J. Capetanakis, IEEE *Transaction on Information Theory*, Vol. IT-25, No. 5, 505–515 (1979). It is basically a preorder binary-tree traversal algorithm. A binary tree is organized in such a way that each leaf is associated with a station in the network. The search begins at the root, and all ready stations can transmit in the first contention slot. If a collision occurs, the search continues recursively with the left and right subtrees in the following contention slots. The search stops when a single ready station is contained in a subtree. After the packet is transmitted, the next contention slot is reserved for the next subtree in the preorder search.

This protocol can be viewed as a moving window protocol in which the size of the window is equal to the number of leaves in the subtree. The objective is to isolate a station with the minimum distance from the origin of the window. Without loss of generality, let it be supposed that the origin is currently at station 1. A ready station i generates a contention parameter that is the distance from 1, while an idle station generates a very large number that is never considered by the protocol, say $N+1$. The probability density function from which a station generates its contention parameter is:

$$f_i(k) = \begin{cases} Pr\ \{i\text{-th station is active}\} & k = i \\ Pr\ \{i\text{-th station is idle}\} & K = N + 1 \\ 0 & \text{otherwise} \end{cases} \quad (34)$$

The probability density function Equation 34 can be inferred from the statistical data collected from the channel. The objective is to provide a dynamic inference method so that an adaptive window-control scheme can be applied.

The channel load is characterized by the number of packets transmitted when the window has circumscribed around the stations once. This number can be collected directly on the network. Suppose there is only one buffer at each station. Let p be the probability of a new packet arriving in a packet-transmission time, assuming that contention time is much smaller than packet time, and $t_i$ be the number of packet times elapsed since the ith station was allowed to transmit. Then $$pr\{\text{ith station is active}|p,t_i\} = 1-(1-p)^{t_i} \quad (35)$$

p is a function of N, the total number of stations in the network, and n, the number of stations that have transmitted when the window has circumscribed over all the stations once. The next station allowed to transmit must have been idle for n packet times, and the probability that a packet is ready is $(1-(1-p)^n)$. For a network of N stations, the expected number of stations that transmit is:

$$N(1-(1-p)^n) = n \quad (36)$$

Solving Equation 36 yields:

$$p = 1 - \left(1 - \frac{n}{N}\right)^{\frac{1}{n}} \quad (37)$$

The term $t_i$ in Equation 35 can also be estimated from n. In order to compute $t_i$, it is necessary to know the minimum and maximum number of stations that could have transmitted when the window has moved from station i to the current origin. The maximum cannot exceed either n or $N-i$, and the minimum cannot be less that either 0 or $n-i$. The number of active stations between station i and the origin has an incomplete binomial distribution with probability $(N-i)/N$.

$$Pr(t_i = k) = \quad (38)$$

$$\frac{\binom{n}{k} \cdot \left(\frac{N-i}{N}\right)^k \cdot \left(1 - \frac{N-i}{N}\right)^{n-k}}{\sum_{j=\max(0,n-i)}^{\min(n,N-i)} \binom{n}{j} \cdot \left(\frac{N-i}{N}\right)^j \cdot \left(1 - \frac{N-i}{N}\right)^{n-j}}$$

The equations derived here are approximations because they assume that each station has constant elapsed time before it is allowed to transmit.

Substituting Equations 35, 37 and 38 into Equation 34, the distribution function for station i, $1 \leq i \leq N$, to generate its contention parameter is:

$$F_i(k) = \quad (39)$$

$$\begin{cases} 0 & k < i \\ 1 - \sum_{j=\max(0,n-i)}^{\min(n,N-i)} \left(1 - \frac{N-i}{N}\right)^{j/n} \cdot Pr(t_i = j) & i \leq k \leq N \\ 1 & k > N \end{cases}$$

From the view of the window protocol, the adaptive-tree-walk protocol is a heuristic way of controlling the window size by halving or doubling it after each contention. Its efficiency can be improved by any control rule of the disclosed invention. The distributions shown in Equation 39 can be applied in the dynamic-programming window control described previously. The distribution has two properties that can simplify the complexities of the dynamic-programming formulation: (1) $F_i(k)=0$ for $k<i$; and (2) $F_i(a)=F_i(b)$ for $i\leq a,b \leq N$. From these, $$Pr(A) = \prod_{i=1}^{a} [1 - F_i(a)] - \sum_{i=a}^{b} F_i(b). \tag{40}$$

$$g(w,a,b) = \frac{1}{Pr(A)} \sum_{i=a}^{w} F_i(w). \tag{41}$$

$$r(w,a,b) = \frac{1}{Pr(A)} \cdot \left\{ \prod_{\substack{j=1 \\ j\neq i}}^{w} [1 - F_j(W)] - \prod_{\substack{j=1 \\ j\neq i}}^{b} [1 - F_j(b)] \right\} \tag{42}$$

$$\left. \prod_{i=1}^{w} [1 - F_i(w)] - \sum_{i=w}^{b} \left[ F_i(b) \cdot \prod_{\substack{j=1 \\ j\neq i}}^{b} [1 - F_j(b)] \right] - \prod_{i=1}^{b} [1 - F_i(b)] \right\}$$

Figure 10:
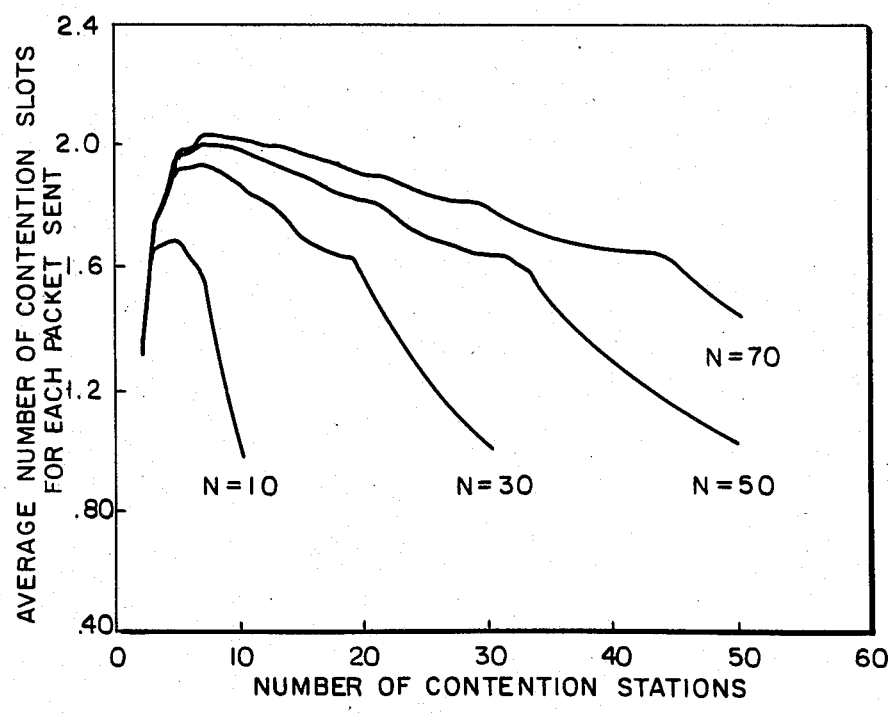
FIG. 10 is a graph illustrating the optimized performance of existing bus contention-resolution protocols by using the disclosed invention.

The performance of the Adaptive-Tree-Walk and Urn Protocols optimized by dynamic-programming window control is shown in FIG. 10 where N is the number of contending stations.

The Urn Protocol was proposed by Kleinrock and Yemini, *Proceeding of International Communication Conference*, 7.2.1–7.2.5 (1978). The protocol does not generate contention parameters, but employs an explicit window control mechanism and is similar to the Adaptive-Tree-Walk Protocol. In the perspective of the window protocol, each ready station generates a contention parameter that is the distance from the origin of the window. The distribution function given in Equation 39 thus applies. The difference lies in the method of window control. In the Urn Protocol, the initial window size, w, is chosen by optimizing the Urn model. During each contention slot, those stations inside the window are allowed to transmit. The window is advanced w positions if there is a successful or no transmission. In case of collision, the window is shrunk to half of its original size. This window-control scheme is good when the ready stations are uniformly distributed. However, due to the round-robin service discipline, those stations closer to the origin of the window have a longer elapsed time since last enabled thus having a higher probability of becoming active. The asymmetry of distributions deteriorates the performance of the conventional Urn Protocol. By using the control methods of the disclosed invention, a better scheme is expected. Since the Urn Protocol uses implicit contending parameters that are similar to the Adaptive-Tree-Walk Protocol, the control rules developed for the latter protocol can also be applied here.

Among the protocols considered, the Tree-Walk and Urn Protocols have the highest certainty about the values of the $x_i$'s. The performance is, therefore, expected to be the best. FIG. 10 verifies this fact and shows that perfect scheduling can be achieved when the load is heavy. It should be noted that the performance degrades as the total number of stations increases. As N approaches $\infty$, the protocol behaves more like one with continuous distributions.

Towsley proposed a window protocol, termed the Arrival Time Window Protocol, in which all stations have a common window on the time axis of length u in the past. IEEE *Transactions on Computers*, Vol. C-31, No. 8, 715–722, (1982). Stations with packets arriving during the window are allowed to contend. If there is a successful contention or no transmission, the window is advanced u units of time. Otherwise the window is reduced to a fraction, f, of its original size, and the process is repeated until a packet is transmitted successfully. The parameters u and f are chosen to optimize the performance. However, they do not reflect instantaneous load conditions.

Let it be assumed that the window begins at time O, the current time is T, and there are n contending stations. Towsley's protocol searches for the earliest packet arrival time in this window. In mapping this to the window protocol, it is equivalent to using the first packet-arrival time in the interval (O,T) in each station as the contention parameter, and granting channel access to the station with the minimum contention parameter. To derive the distribution of the contending parameters, assume the arrival process at each station to be Poisson. The distribution of the first arrival time conditioned on the current time T and the origin of window O is:

$$F_i(t|O < t \leq T) = \begin{cases} 0 & t \leq O \\ \frac{1 - e^{-\lambda_i(t-O)}}{1 - e^{-\lambda_i(T-O)}} & O < t \leq T; i = 1, \ldots, N \\ 1 & t > T \end{cases} \tag{43}$$

where $\lambda_i$ is the packet arrival rate at station i. This distribution is an incomplete exponential distribution. Notice that if $\lambda_i \neq \lambda_j$, then $F_i(t) \neq F_j(t)$.

Since these contention parameters can be transformed into parameters that are independent and uniformly distributed over (0,1) (Equation 33), Equations 4 and 5 can be reduced to simpler forms:

$$g(w,a,b) = \frac{(w-a) \cdot [(1-w)^{n-1} - (1-b)^{n-1}]}{(1-a)^n - (1-b)^n - n(b-a) \cdot (1-b)^{n-1}} \tag{44}$$

$$r(w,a,b) = \frac{(1-w)^n - (1-b)^n - n(b-w) \cdot (1-b)^{n-1}}{(1-a)^n - (1-b)^n - n(b-a) \cdot (1-b)^{n-1}} \tag{45}$$

These equations can be applied in the dynamic-programming window control (Equation 2).

The window protocol provides a distributed way of finding extreme values from a set of random numbers.

With this protocol, an extremum can be sought at the speed of data transmission without introducing additional overhead in information exchange. This extremum identification is a general primitive operation in many applications. For example, sorting of a set of numbers can be done by identifying the extrema sequentially. Some applications are intrinsically extremum-identification problems, while others may be solved with the aid of extremum identification. An example an global priority identification is demonstrated below:

The identification of the most immediate priority level in the network is equivalent to finding the most immediate priority from a set of n contending stations (priority classes ranging from 1 to P). It can be solved by the contention-resolution algorithm in which the highest priority class at each station is used as the contention parameter. Illustratively, the most immediate priorty could be the highest priority level in the network.

In pursuing the distributions of the priority classes, it is assumed that the message arrival rate of priority class i at station j is $\lambda_{i,j}$ $$\left(\lambda_i = \sum_{j=1}^{N} \lambda_{i,j}\right),$$

and the corresponding service rate is $\mu_{i,j}$. Suppose the channel can service a message of class i at rate $\mu_i$. Since a lower priority message can only be serviced during an idle period of servicing higher priority messages, the effective service rate of class i messages in the channel is:

$$\mu_i^e = \mu_i \cdot \prod_{k=i+1}^{P} (1 - \rho_k) \quad i = 1, 2, \ldots, P \tag{46}$$

where $\rho_k$ is the traffic intensity of class k messages in the system. By definition, $$\rho_i = \frac{\lambda_i}{\mu_i^e} \quad i = 1, 2, \ldots, P \tag{47}$$

From queueing theory, the effective service rate of class i messages at node j is:

$$\mu_{i,j}^e = \mu_i^e \cdot \frac{\lambda_{i,j}}{\lambda_i} \quad i = 1, \ldots, P; j = 1, \ldots, N \tag{48}$$

The traffic intensity of class i messages at node j is:

$$\rho_{i,j} = \frac{\lambda_{i,j}}{\mu_{i,j}^e} \quad i = 1, \ldots, P; j = 1, \ldots, N \tag{49}$$

Class i will be empty at node j with probability $1-\mu_{i,j}$. Thus node j will generate a contention parameter of value p with probability:

$$f_j(p) = \rho_{p,j} \cdot \prod_{i=p+1}^{P} (1 - \rho_{i,j}) j = 1, \ldots, N; p = 1, \ldots, P \tag{50}$$

The distribution of the contention parameter at node j is:

$$F_j(p) = \sum_{k=1}^{p} f_j(k) j = 1, \ldots, N; p = 1, \ldots, P \tag{51}$$

The optimization of window protocols for priority resolution using dynamic programming is similar to, but more efficient than, protocols with continuous distributions because the contention parameters can only be assigned integers, and recursion can stop when the window size is smaller than one. The boundary conditions for the dynamic-programming formulation (Eq. 2) become:

$$n(a,b) = 0 \text{ for all } (b-a) \leq 1 \tag{52}$$

Figure 11:
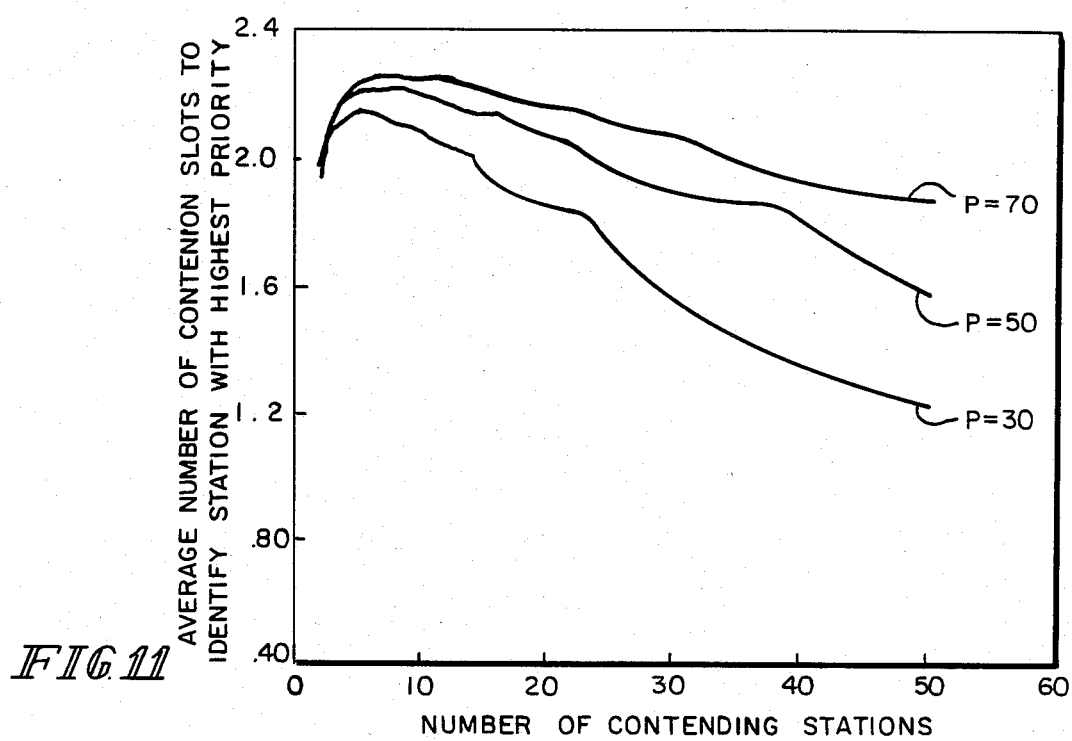
FIG. 11 is a graph illustrating the performance of an embodiment of the disclosed window protocol for global priority resolution.

These boundary conditions assure that contention can always be resolved in finite steps. The performance was evaluated by assuming that a packet has equal probability of being at any priority level. FIG. 11 illustrates the performance of the window protocol for global priority resolution operated under dynamic-programming window control where P is the number of priority levels. The results plotted in FIG. 11 show that the expected number of contention steps is bounded by a constant regardless of channel load. The performance is improved when the channel load is heavy because there is increased certainty for a high priority message to exist. However, the performance is slightly worse when the number of priority levels is large.

Two methods of applying the code deciphering scheme to support global priority identification are described below.

The code space of the original MACD scheme is partitioned into subspaces so that each subspace corresponds to a priority level. The partition should satisfy the following condition:

$$\text{If } X \epsilon S_i, Y \epsilon S_j \text{ and } i<j, \text{ then } X<Y \tag{53}$$

where $S_i$ and $S_j$ are subspaces corresponding to priority levels i and j respectively. Using this partitioning, priority levels are encoded into the contending codes, and the deciphering function discussed previously can identify the global priority level and the largest code in this level.

A contention period can be divided into two phases: a priority-resolution phase followed by an intra-class contention phase. In the priority-resolution phase, a strictly increasing function that maps a set of priority levels onto a code space is defined in each contention slot. The mapping is done so that the minimum number of priority levels is assigned to the same code. In a contention slot, every contending station writes its code to the bus and deciphers the number read from the bus. A set of stations with the most immediate priority levels, illustratively the highest priority levels, (corresponding to the deciphered code) are identified. The process is repeated until the set of stations with the most immediate priority level are identified. When the bus width is larger than or equal to the number of priority levels, this phase can be completed in one contention slot.

One of the functions of a computer network is to allow the sharing of resources that include the access of programs and databases, and the sharing of computational facilities. Load balancing is a scheme that engages communication facilities to support remote job execution in a user-transparent manner so that the utilization of resources is improved. Depending on the workload of processors on the network, the network operating system may distribute newly arrived jobs to a remote processor, or may schedule them for local execution. In practice, the scheduling is embedded in operating system controls and incurs a large overhead of status distributions. A more efficient way to implement load balancing on multiaccess bus systems is described here.

On multiaccess bus systems, only one job can be sent over the network at any time. The best strategy is to send a job from the processor with the heaviest load to the processor with the lightest load. In order to support this load balancing strategy, the following tasks are involved:

(a) to decide when load balancing is needed;
(b) to identify the processors with the maximum and minimum load;
(c) to send a job from the processor with the maximum load to the processor with the minimum load; and
(d) to send the results of execution back to the originating site.

Three basic operations are needed to support these tasks:

(a) Contention resolution for packet transmission: When multiple processors wish to transmit, each processor generates a random number. The processor assigned the channel is the one with the minimum number.
(b) Identification of the processor with the maximum (resp. minimum) load: The load on a processor is characterized by the response time of executing a job on that processor. The response times of all the processors are distributed in the interval $[0, \infty)$. Finding the processor with the maximum (resp. minimum) load is equivalent to finding the maximum (resp. minimum) of a set of random numbers in the interval $[0, \infty)$.
(c) Identification of processors with the global priority: The priority of a processor is an integer from the set $\{0, 1, \ldots, p_{max}\}$. The identification problem searches for the maximum priority value of all the processors in this interval.

Figure 12:
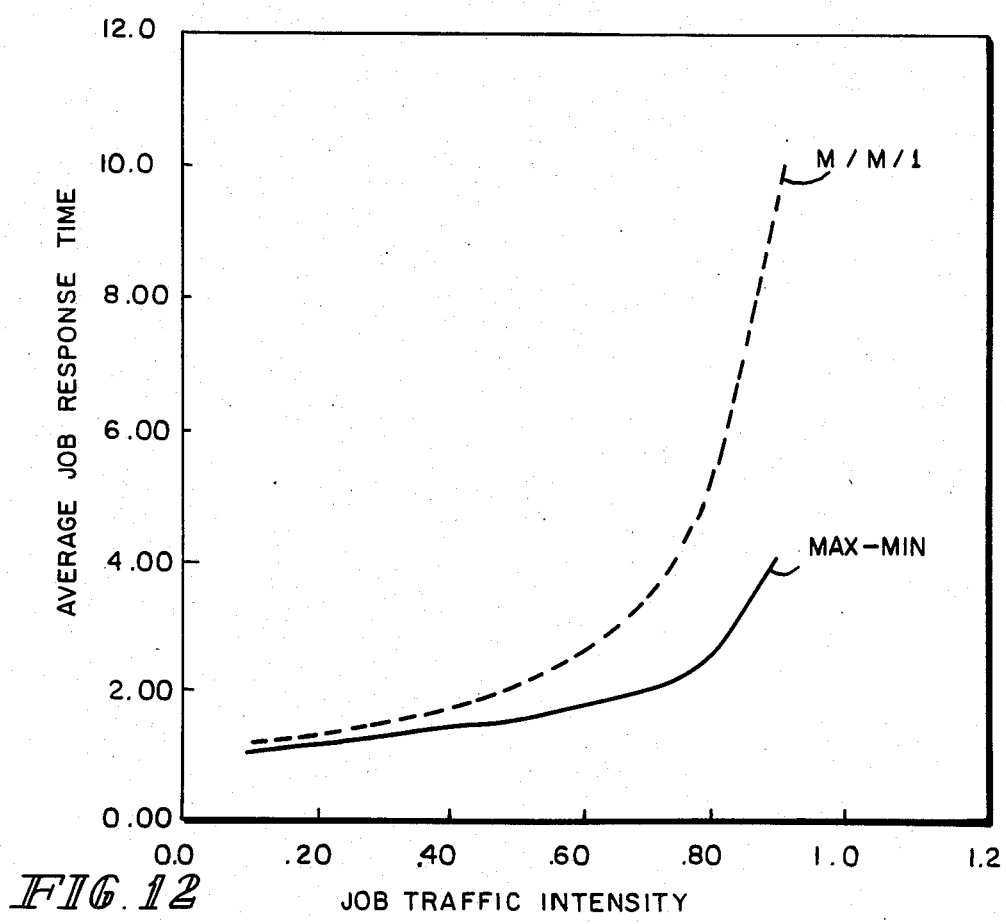
FIG. 12 is a graph illustrating reduction in job response time by using load balancing.

The three operations can be implemented efficiently by the disclosed contention-resolution algorithm. A simulator was developed to evaluate the performance of load balancing as supported by the contention resolution algorithm. The simulator was written in ASPOL and was run on a CDC 6600. It was assumed that job arrivals were Poisson at each processor and the service time was exponentially distributed. FIG. 12 illustrates the reduction in job response time under load balancing with no message traffic where the number of processors is equal to twenty and the ratio of service to transmission delays is one. The normalized mean job response time is plotted against different job traffic intensity with no message traffic in FIG. 12. The results are compared against the case without load balancing, that is, the case of multiple independent M/M/1 queues. This shows that the response time is always better when load balancing is applied.

Figure 13:
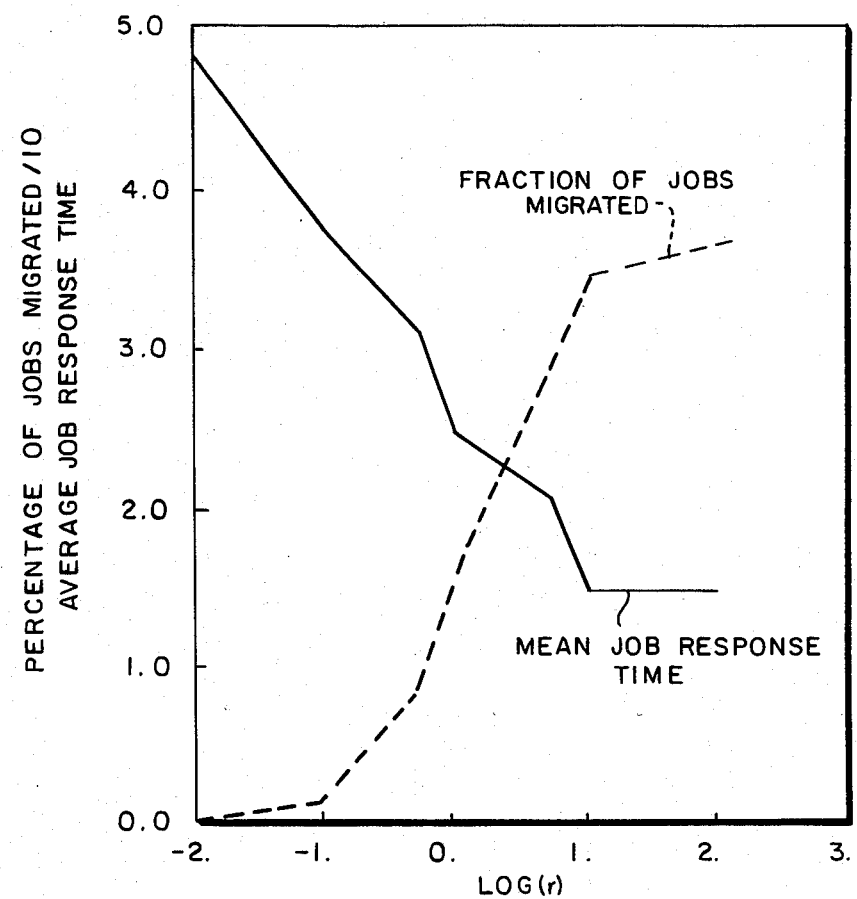
FIG. 13 is a graph illustrating the effect of the ratio of service to transmission delays on load balancing.
Figure 14:
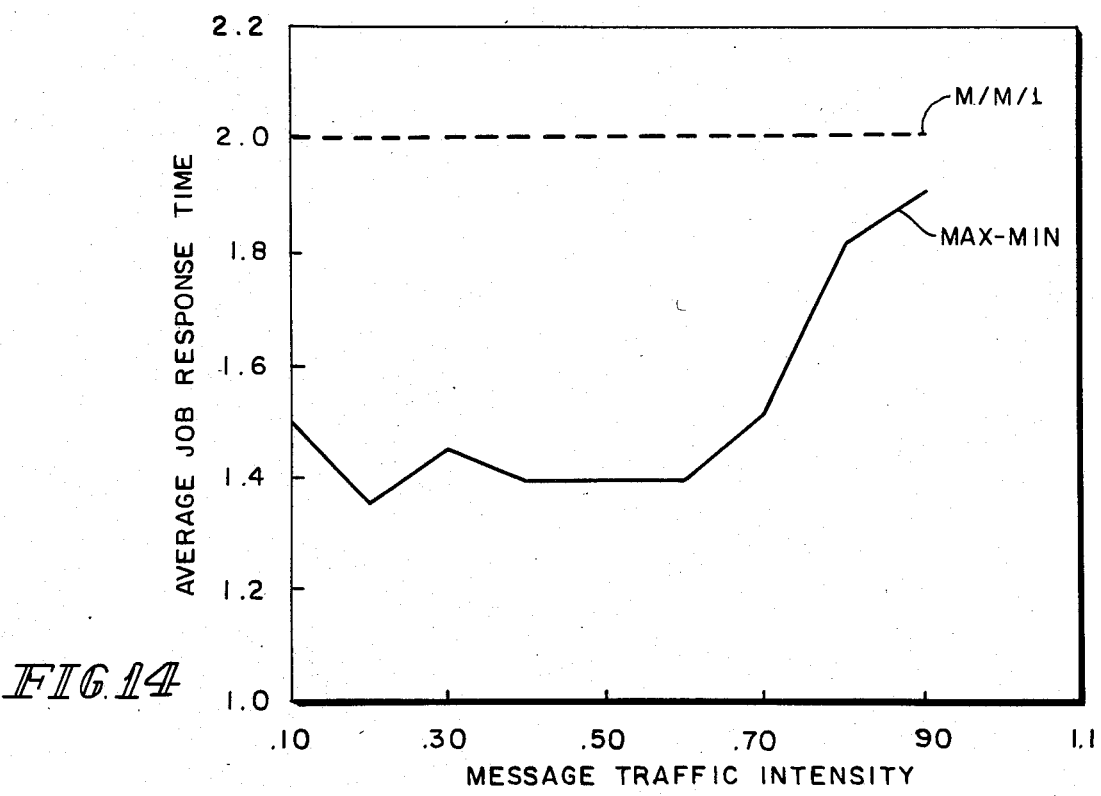
FIG. 14 is a graph showing the effect on load balancing due to message traffic.

Since the queue at each processor is almost empty when the job traffic is low, load balancing is less effective. FIG. 13 illustrates the effect of the ratio of service to transmission delays, r, on load balancing where the number of processors is equal to twenty. In FIG. 13, the job response time with respect to the ratio of job service time and transmission delay is shown. The percentage of jobs being migrated is also shown. As interpreted from this figure, a system with fast processors coupled with a slow communication channel (r is small) will not benefit from load balancing. As the speed of the communication channel increases, more jobs are migrated and the response time is improved. However, when the channel speed exceeds a certain threshold, load balancing can provide little improvement. In the simulator, the policy is chosen so that load balancing is invoked when the network is idle. This policy assures that the transfer of regular messages is not deteriorated by load balancing. FIG. 14 illustrates the effect on load balancing due to message traffic where the job traffic intensity at each processor is equal to 0.5 and the number of processors is equal to twenty. As message traffic becomes higher, the effective channel capacity is less and load balancing is not carried out as often.

Resource sharing mechanisms play a role similar to the load balancing mechanism previously described. However, the resources considered here do not have buffers, and jobs are queued at requesting sites until they are ready to be scheduled. Conventionally, the dispatch of requests to idle resources is done in the operating system by maintaining a resource table. This centralized approach has large message overheads, is unreliable and potentially may become a bottleneck. The contention-resolution protocol disclosed here can be used as a decentralized protocol for scheduling resources. The scheme includes two phases: a request-contention phase and an acknowledge-contention phase.

(a) Request contention: Whenever there is a job in the queue, a local dispatcher contends for the channel to broadcast a request and to identify itself. Different types of request are allowed to contend in this phase. A request may need multiple resources.
(b) Acknowledge contention: Immediately following a successful request contention, all idle servers that are capable of executing the request will contend to acknowledge the request. If the request needs multiple resources, all the resources have to be searched and allocated in one contention interval to avoid deadlock. Allocating multiple resources to a request is done by repeating the acknowledge phase. The resources to service the request are found at the end of this phase, and the request and resources cooperate in job execution through the communication facilities.

A contending parameter generated in either phase of contention may be a uniformly distributed random number. It may also be generated according to certain scheduling policy. For example, the arrival time of a request may be used as the request contention parameter to facilitate a first-come-first-serve (FCFS) scheduling policy.

Although the invention has been described in detail with reference to certain preferred embodiments and specific examples, variations and modifications exist within the scope and spirit of the invention as described and as defined in the following claims.

What is claimed is:

1. In a data communication system having a common bus with time division multiplexing and a plurality of stations coupled to the bus, a bus contention resolution process for resolving which station is permitted to transmit data onto the bus during a given time slot, comprising the steps of (a) each station wishing to contend for the bus to transmit data during the time slot generating a contention parameter;

(b) each station generating a window boundary, w, as a function of: an interval lower boundary, lb, an interval upper boundary, ub; an estimated number, n, of contending stations; and a distribution function, F, of the contention parameters;

(c) each station generating a window having boundaries w and one of lb and ub;

(d) each station wishing to contend for the bus comparing its contention parameter to the window and contending for the bus by transmitting to the bus when its contention parameter falls within the window;

(e) each station sensing the status of the bus;

(f) each station adjusting its window in response to the bus status it sensed indicating the bus was idle or a collision occurred and repeating steps d-f until only one contending station is isolated as having successfully contended for the bus; and (g) the isolated station transmitting data in the time slot.

2. The process of claim 1 and further including the step of terminating the contention process after a predetermined number of iterations of steps d−f.

3. The process of claim 1 and further including the step of estimating n by equating n to a ceiling function $$\left[ \frac{-1}{\ln(1 - w(t-1))} \right]$$

where w(t−1) is the final window boundary derived from the contention process for the immediately preceding time slot, and $0 < w(t-1) < 1$.

4. The process of claim 3 wherein, for the purposes of estimating n, w(t−1) is estimated by an auto-regressive-moving-average model.

5. The process of claim 1 wherein F comprises a uniform distribution function.

6. The process of claim 1 and further comprising the steps of (h) broadcasting an extremum over the bus and (i) restarting the contention resolution process if a contending station disagrees with the extremum.

7. The process of claim 1 and further including a step wherein each station collects statistical information concerning bus activity, the step of generating a window boundary, w, includes a step of estimating n as a function of the collected statistical information.

8. The process of claim 1 wherein the step in which each contending station generates a contention parameter comprises a step wherein each contending station generates a contention parameter related to a priority for the station, and the step wherein each station adjusts its window comprises a step wherein each station adjusts its window to isolate the station with the most immediate priority.

9. The process of claim 1 wherein the step in which each device adjusts its window in response to the bus status it sensed comprises a step wherein each device adjusts its window in the same manner for a particular sensed bus status.

10. The process of claim 9 wherein the window has the boundaries lb and w and the step of adjusting the window comprises equating ub to w when the sensed bus status indicates a collision has occurred, equating lb to w when the sensed bus status indicates no station contended, and, in either case, generating a new w as a function of n, F, lb, and ub.

11. The process of claim 9 wherein the window has the boundaries w and ub and the step of adjusting the window comprises equating lb to w when the sensed bus status indicates a collision has occurred, equating ub to w when the sensed bus status indicates no station contended, and, in either case, generating a new w as a function of n, F, lb, and ub.

12. The process of claim 9 wherein the bus comprises an asynchronous, serial bus having three-state collision detection.

13. The process of claim 1 wherein the step of each station generating its window boundary w comprises each station recursively optimizing the step of generating w in accordance with the equation.

$$n(a,b) = \min_{a < w < b} \{1 + O \cdot g(w,a,b) + n(a,w) \cdot l(w,a,b) + n(w,b) \cdot r(w,a,b)\}$$

where n(a,b): the minimum expected number of contention slots to resolve contention given that all contention parameters are in the window (a, U] and collision occurs in the current window (a,b];

g(w,a,b): probability of successful transmission in the next contention slot is a window of (a,w], $a < w < b$, is used;

l(w,a,b): probability of collision in the next contention slot if a window of (a,w], $a < w < b$, is used;

r(w,a,b): probability of no transmission in the next contention slot if a window of (a,w], $a < w < b$, is used;

a: lower boundary of the current window (L being the minimum);

b: upper boundary of the current wind (U being the maximum); and $l(w,a,b) + g(w,a,b) + r(w,a,b) = 1$.

14. The process of claim 1 wherein the step of each station generating its window boundary w comprises each station generating w by using optimal greedy window control wherein $$g(w,a,b) = \frac{K[F(w) - F(a)] \cdot \{[1 - F(w)]^{n-1} - [1 - F(b)]^{n-1}\}}{[1 - F(a)]^n}$$

where $K = n/Pr(A)$;

a = the lower boundary of the current window (L being the minimum lower boundary);

b = the upper boundary of the current window (U being the maximum upper boundary);

$$Pr(A) = \frac{\prod_{i=1}^{n}[1 - F_i(a)] - \sum_{i=1}^{n}\{[F_i(b) - F_i(a)] \cdot \prod_{\substack{j=1 \\ j \neq i}}^{n}[1 - F_j(b)]\} - \prod_{i=1}^{n}[1 - F_i(b)]}{\prod_{i=1}^{n}[1 - F_i(a)]};$$

g(w,a,b) = the probability of a successful contention occurring in the next contention slot; and said distribution function F comprises identical continuous distributions for said contention parameters.

15. The process of claim 1 wherein the step of each station generating its window boundary w comprises each station generating w by generating $w_a$, an estimated w, by approximate greedy window control wherein $$g(w,a,b) = \frac{K' \cdot [F(w) - F(a)] \cdot [F(b) - F(w)] \cdot [1 - F(w)]^{n-2}}{[1 - F(a)]^n}$$

where
$K' = (n-1) \cdot K$;
$K = n/Pr(A)$;
a = the lower boundary of the current window (L being the minimum lower boundary);
b = the upper boundary of the current window (U being the maximum boundary);

$$Pr(A) = \frac{\prod_{i=1}^{n}[1 - F_i(a)] - \sum_{i=1}^{n}\{[F_i(b) - F_i(a)] \cdot \prod_{\substack{j=1 \\ j \neq i}}^{n}[1 - F_j(b)]\} - \prod_{i=1}^{n}[1 - F_i(b)]}{\prod_{i=1}^{n}[1 - F_i(a)]};$$

g(w,a,b) = the probability of a successful contention occurring in the next contention slot;

$$F(w_a) = \frac{-C - \sqrt{C^2 - 4D}}{2},$$

in the interval (F(a), F(b));

$$C = \frac{-(n-1) \cdot [F(a) + F(b)] + 2}{n}; \text{ and}$$

$$D = \frac{F(a) + F(b) + (n-2) \cdot F(a) \cdot F(b)}{n};$$

and said distribution function F comprises identical continuous distributions for said contention parameters.

16. In a time division multiplex data communication system having a plurality of data communication stations coupled to each other by a common bus, a contention resolution process for resolving which station is permitted to transmit data onto the bus during a given time interval, comprising the steps wherein
(a) each station that wishes to contend for the bus to transmit data during the time interval generates a contention parameter;
(b) each station generates a window boundary, w, as a function of: an interval lower boundary, lb, an interval upper boundary, ub; an estimated number, n, of contending stations; and a distribution function, F, of the contention parameters;
(c) each station generates a window having boundaries w and one of lb and ub;
(d) each station that wishes to contend for the bus compares its contention parameter to the window and contends for the bus when its contention parameter falls within the window;
(e) each contending station generates a contention code;
(f) each contending station writes its contention code to the bus;
(g) each contending station reads the bus;
(h) each contending station compares what it read from the bus to the contention code it wrote to the bus and determines if it can continue to contend for the bus in response to the comparison; and
(i) each station which determines that it can continue to contend for the bus repeating steps f—i until a station is selected and permitted to transmit data onto the bus during the given time interval.

17. The process of claim 16 wherein the step of each contending station generating a contention code and writing the contention code to the bus comprises each contending station using its contention parameter as the contention code and writing its contention parameter to the bus.

18. The process of claim 16 and further including the step wherein each contending station uses a deciphering function to compute a deciphered code from what it read and the step of each station comparing what it read from the bus to what it wrote to the bus comprises the step of each contending station comparing its deciphered code to what it wrote to the bus.

19. The process of claim 18 wherein each deciphered code comprises the maximum code written to the bus among those codes written by the contending stations, a contending station determining that it has contended unsuccessfully when its written code is less than the deciphered code, and a contending station determining that it can continue to contend for the bus when its written code is not less than the deciphered code.

20. The process of claim 19 wherein the contention resolution process further includes the steps of each contending station whose contention code is not less than its deciphered code writes a unique station identification code to the bus, reads the bus again, determines that it has successfully contended when its station identification code is equal to what it read from the bus the second time, and restarts the contention resolution process when its station identification code is not equal to what it read from the bus the second time, in order to resolve hidden collisions.

21. The process of claim 19 wherein the bus comprises a bit parallel bus and the step of each contending station generating a contention code comprises each contending station generating a binary random number.

22. The process of claim 21 wherein the binary random number comprises a unary random number.

23. The process of claim 18 wherein each deciphered code comprises the minimum code written to the bus among those codes written by the contending stations, a contending station determining that it has contended unsuccessfully when its written code is greater than the deciphered code, and a contending station determining that it can continue to contend for the bus when its written code is not greater than the deciphered code.

24. The process of claim 23 wherein the contention resolution process further includes the steps of each contending station whose contention code is not less than its deciphered code writes a unique station identification code to the bus, reads the bus again, determines that it has successfully contended when its station identification code is equal to what it read from the bus the second time, and restarts the contention resolution process when its station identification code is not equal to what it read from the bus the second time, in order to resolve hidden collisions.

25. The process of claim 23 wherein the bus comprises a bit parallel bus and the step of each contending station generating a contention code comprises each contending station generating a binary random number.

26. The process of claim 25 wherein the binary random number comprises a unary random number.

27. The process of claim 16 wherein the step in which each station contending for the bus generates a contention code comprises the step in which each station generates a unique code.

28. The process of claim 27 wherein the station transmitting the maximum unique code is permitted to transmit data onto the bus during the time interval.

29. The process of claim 27 wherein the station transmitting the minimum unique code is permitted to transmit data onto the bus during the time interval.

30. The process of claim 16 and further including the steps in which each contending station generates as its contention code a unique station identification code, determines that a hidden collision has occurred when what it read from the bus does not match its written code, and repeats the contention resolution process when it detects a hidden collision.

31. The process of claim 16 wherein the step in which each contending station generates a code comprises the steps of generating a code indicative of a priority of the station.

32. The process of claim 16 wherein each contending station repeats the contention resolution process a predetermined number of times to increase the probability that one contending station has been isolated, selected and permitted to transmit data onto the bus during the given time interval.

33. The process of claim 32 wherein the contention resolution process further includes the steps of each station which determines that it can continue to contend for the bus after the determined number of times writes a unique station identification code to the bus, reads the bus after writing its station identification code, determines that it has successfully contended when its station identification code is equal to what it reads from the bus after it wrote its station identification code, and restarts the contention resolution process when its station identification code is not equal to what it has read from the bus after it wrote its station identification code, in order to resolve hidden collisions.

34. The process of claim 16 wherein the step in which each contending station generates a contention code comprises the step of choosing a binary random number $X_i$, $i=1, \ldots, N$, $N$ being the number of contending stations, from a code space of $S$, the $X_i$'s having the properties of $$X_i, X_j \epsilon S, i \neq j, X_i \neq X_j,$$

and $$f(X_1 \oplus X_2 \oplus \ldots \oplus X_N) \leq \max(X_1, X_2, \ldots, X_N) X_i \epsilon S, N \geq 1.$$

35. The process of claim 34 and further including the step of estimating N in a current contention period t by $$N(t) = \frac{B(t-1) \cdot K(t-1)}{W}$$

where $B(t-1)$ is the number of bits that are ones in the previous contention period $(t-1)$; $K(t-1)$ is the size of the code space for the previous contention period $(t-1)$; and W is the width of the bus.

36. The process of claim 34 wherein the step of choosing a binary random number comprises the step of choosing a unary random number.

37. The process of claim 16 wherein the step of generating a contention code comprises the step of selecting a binary number from a code space S.

38. The process of claim 37 wherein the bus has a width W and the code space has a size K equal to W.

39. The process of claim 37 wherein the bus has a width W, the code space S has a size K, N is the number of contending stations, r is a constant selected to reduce the number of contention slots to isolate one contending station wherein $K/N = r$.

40. The process of claim 39 and further including the step of estimating N in a current contention period t by $$N(t) = \frac{B(t-1) \cdot K(t-1)}{W}$$

where $B(t-1)$ is the number of bits that are ones in the previous contention period $(t-1)$; $K(t-1)$ is the size of the code space for the previous contention period $(t-1)$; and W is the width of the bus.

41. The process of claim 39 wherein K is chosen to be W when $r \cdot N \leq W$.

42. The process of claim 37 wherein the code space S comprises a plurality of partitioned subspaces, each subspace corresponding to a priority level.

43. The process of claim 42 wherein each partition satisfies the condition:

if $X \epsilon S_i$, $Y \epsilon S_j$ and $i > j$; then $X > Y$ where $S_i$ and $S_j$ are subspaces corresponding to priority levels i and j, respectively, and X and Y are contention codes.

44. The process of claim 37 wherein the step of selecting a binary number comprises the step of selecting a unary number.

45. The process of claim 44 wherein the bus has a width W and the code space has a size K equal to W.

46. The process of claim 44 wherein the bus has a width W, the code space S has a size K, N is the number of contending stations, r is a constant selected to reduce the number of contention slots to isolate one contending station wherein $K/N = r$.

47. The process of claim 46 and further including the step of estimating N in a current contention period t by $$N(t) = \frac{B(t-1) \cdot K(t-1)}{W}$$

where $B(t-1)$ is the number of bits that are ones in the previous contention period $(t-1)$; $K(t-1)$ is the size of the code space for the previous contention period $(t-1)$; and W is the width of the bus.

48. The process of claim 46 wherein K is chosen to be W when $r \cdot N \leq W$.

49. The process of claim 44 wherein the code space S comprises a plurality of partitioned subspaces, each subspace corresponding to a priority level.

50. The process of claim 49 wherein each partition satisfies the condition:

if $X \epsilon S_i$, $Y \epsilon S_j$ and $i < j$; then $X < Y$ where $S_i$ and $S_j$ are subspaces corresponding to priority levels i and j, respectively, and X and Y are contention codes.

51. In a computer network having a plurality of computers coupled together by a common bus for the sharing of computational resources among the computers, the network characterized by the capacity to send a job from a more loaded source computer to a less loaded destination computer, a method for determining a source computer and a destination computer, comprising the steps wherein
   (a) each computer maintains a global window;
   (b) each computer generates a contention parameter related to its response time for executing a job;
   (c) each computer contends for the bus when its contention parameter falls within its window;
   (d) each computer senses a status of the bus;
   (e) each computer adjusts its window and repeats steps c and d until a computer having the highest contention parameter and a computer having the lowest contention parameter have been identified; and
   (f) the computer identified as having one of the highest and lowest contention parameters sending a job to the computer identified as having the other of the highest and lowest contention parameters.

52. The method of claim 51 wherein the computer identified as having the highest contention parameter sends a job to the computer identified as having the lowest contention parameter.

53. The method of claim 51 wherein the computer identified as having the lowest contention parameter sends a job to the computer identified as having the highest contention parameter.

54. In a computer network having a plurality of computers coupled together by a common bus for the sharing of computational resources among the computers, the network characterized by the capacity to send a job queued at a requesting computer to an idle computer, a method for determining from which of a plurality of requesting computers a job is to be sent and for determining to which of a plurality of idle computers the job is to be sent, comprising the steps wherein,
   (a) each contending requesting computer maintains a global window;
   (b) each contending requesting computer generates a contention parameter;
   (c) each contending requesting computer compares its contention parameter to its window;
   (d) a contending requesting computer contends for the bus when its contention parameter falls within its window;
   (e) each contending requesting computer senses a status of the bus;
   (f) each contending requesting computer determines if it has gained control of the bus, based upon the bus status it sensed indicating that it has been isolated as the only computer contending for the bus, such isolated computer transmitting a request on the bus;
   (g) each contending requesting computer adjusts its window in response to the bus status it sensed and repeats steps c-f if the sensed bus status indicated that one contending idle computer has not been isolated;
   (h) each contending idle computer maintains a global window;
   (i) each contending idle computer generates a contention parameter;
   (j) each contending idle computer compares its contention parameter to its window;
   (k) a contending idle computer contends for the bus when its contention parameter falls within its window;
   (l) each contending idle computer senses a status of the bus;
   (m) each contending idle computer determines if it has gained control of the bus, based upon the bus status it sensed indicating that it has been isolated as the only computer contending for the bus, such isolated computer acknowledging the request and receiving the job from the isolated requesting computer; and
   (n) each contending idle computer adjusts its window in response to the bus status it sensed and repeats steps j—m if the sensed bus status indicated that one contending idle computer has not been isolated.

* * * * *

UNITED STATES PATENT AND TRADEMARK OFFICE
CERTIFICATE OF CORRECTION

PATENT NO. : 4,630,264  Page 1 of 9
DATED : December 16, 1986
INVENTOR(S) : Benjamin W. Wah and Jie-Yong Juang It is certified that error appears in the above-identified patent and that said Letters Patent is hereby corrected as shown below:

At column 4, line 15, please delete "n" and insert therefor --$\hat{n}$--;

At column 4, line 25, please delete "n" and insert therefor --$\hat{n}$--;

At column 5, line 32, please delete "l(w,a,b)" and insert therefor --$\ell(w,a,b)$--;

At column 5, Equation 1, please delete "l(w,a,b)" and insert therefor --$\ell(w,a,b)$--;

At column 5, Equation 2, please delete "l(w,a,b)" and insert therefor --$\ell(w,a,b)$--;

At column 6, line 1, please delete "l(w,a,b)" and insert therefor --$\ell(w,a,b)$--;

At column 6, line 24, please delete "Pr{A B}" and insert therefor --Pr{A$\cap$B}--;

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 6, line 27, please delete "Pr{A C}" and insert therefor --Pr{A∩C}--;

At column 6, line 35, please delete "'≦li≦N" and insert therefor --1≦i≦N--;

At column 6, Equation 3, please delete "π" and insert therefor --Π-- in each occurrence;

At column 6, Equation 4, please delete "π" and insert therefor --Π--- in each occurrence;

At column 7, Equation 5, please delete "π" and insert therefor --Π-- in each occurrence;

At column 7, line 66, please delete "computer" and insert therefor --computed--;

At column 9, Equation 7, please delete "[-" and insert therefor --[--;

At column 10, line 19, please delete "g(w,a,b)" and insert therefor --ĝ(w,a,b)--;

UNITED STATES PATENT AND TRADEMARK OFFICE
CERTIFICATE OF CORRECTION

PATENT NO. : 4,630,264     Page 3 of 9

DATED : December 16, 1986

INVENTOR(S) : Benjamin W. Wah and Jie-Yong Juang

It is certified that error appears in the above-identified patent and that said Letters Patent is hereby corrected as shown below:

At column 10, Equation 11, please delete "g(w,a,b)" and insert therefor --$\hat{g}(w,a,b)$--;

At column 10, line 30, please delete "g(w,a,b)" and insert therefor --$\hat{g}(w,a,b)$--;

At column 10, line 32, please delete "g(w,a,b)" and insert therefor --$\hat{g}(w,a,b)$--;

At column 11, Equation 14, please delete "l(w,a,b)" and insert therefor --$\ell(w,a,b)$--;

At column 11, line 43, please delete "l(w,a,b)" and insert therefor --$\ell(w,a,b)$--;

At column 11, line 44, please delete "l(w,a,b)" and insert therefor --$\ell(w,a,b)$--;

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 13, please delete Equation 17 and insert therefor $$-- f_{Y_1}(y | a<Y_1<w<Y_2) = \frac{\int_w^1 f_{Y_1 Y_2}(y_1, y_2) dy_2}{\int_a^w \int_w^1 f_{Y_1 Y_2}(y_1, y_2) d\underline{y}_2 dy_1} --;$$

At column 15, Equation 22, please delete "}" and insert therefor --},--;

At column 17, line 6, please delete "sucess" and insert therefor --success--;

At column 17, line 62, please delete "it" and insert therefor --It--;

At column 21, line 19, please delete "l" and insert therefor --$\ell$--;

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 21, line 27, please delete "1" and insert therefor --$\ell$--;

At column 21, line 34, please delete "/(21));" and insert therefor --/($2\ell$));--;

At column 21, line 41, please delete "1:=1/$2^W$]" and insert therefor --$\ell:=\ell/2^W$]--;

At column 22, Equation 32, please delete "N(t) =" and insert therefor --$\hat{N}$(t) =--;

At column 24, line 48, please delete "that" and insert therefor --than--;

At column 25, Equation 40, please delete "$\pi$" and insert therefor --$\Pi$-- in each occurrence;

At column 25, Equation 41, please delete "$\pi$" and insert therefor --$\Pi$-- in each occurrence;

UNITED STATES PATENT AND TRADEMARK OFFICE
CERTIFICATE OF CORRECTION

PATENT NO. : 4,630,264                                  Page 6 of 9

DATED      : December 16, 1986

INVENTOR(S) : Benjamin W. Wah and Jie-Yong Juang

It is certified that error appears in the above-identified patent and that said Letters Patent is hereby corrected as shown below:

At column 25, Equation 42, please delete "$\pi$" and insert therefor --$\Pi$-- in each occurrence;

At column 26, line 52, please delete "$F_i(t) \int F_j(t)$" and insert therefor --$F_i(t) \neq F_j(t)$--;

At column 27, Equation 46, please delete "$\pi$" and insert therefor --$\Pi$--;

At column 27, Equation 48, please delete "$\mu^e{}_{ij}$" and insert therefor --$\mu_{i,j}{}^e$--;

At column 27, Equation 49, please delete "P:" and insert therefor --P;--;

At column 27, line 59, please delete "$1-\mu_{i,j}$" and insert therefor --$1-\rho_{i,j}$--;

At column 27, Equation 50, please delete "$\pi$" and insert therefor --$\Pi$--;

At column 28, Equation 52, please delete "$(b-a) \leq 1$" and insert therefor --$(b-a) < 1$--;

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 28, Equation (53), please delete "i<j, then X<Y" and insert therefor --i>j, then X>Y--;

At column 32, line 32, please delete "l(w,a,b)" and insert therefor --$\ell$(w,a,b)--;

At column 32, line 42, please delete "l(w,a,b):" and insert therefor --$\ell$(w,a,b):--;

At column 32, line 52, please delete "l(w,a,b)" and insert therefor --$\ell$(w,a,b)--;

At column 33, please delete the equation appearing at lines 1-8 and insert therefor $$--\Pr(A) = \frac{\prod_{i=1}^{n}[1-F_i(a)] - \sum_{i=1}^{n}\left\{[F_i(b)-F_i(a)] \cdot \prod_{\substack{j=1 \\ j \neq i}}^{n}[1-F_j(b)]\right\} - \prod_{i=1}^{n}[1-F_i(b)]}{\prod_{i=1}^{n}[1-F_i(a)]}; --$$

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 33, line 19, please delete "g(w,a,b)" and insert therefor --$\hat{g}(w,a,b)$--;

At column 33, line 22, please delete "K=(n-1)·K;" and insert therefor --K'=(n-1)·K;--;

At column 33, please delete the equation appearing at lines 29-36 and insert therefor $$-- \Pr(A) = \frac{\prod_{i=1}^{n}[1-F_i(a)] - \sum_{i=1}^{n}\left\{[F_i(b)-F_i(a)] \cdot \prod_{\substack{j=1 \\ j \neq i}}^{n}[1-F_j(b)]\right\} - \prod_{i=1}^{n}[1-F_i(b)]}{\prod_{i=1}^{n}[1-F_i(a)]} ; --;$$

At column 36, line 19, please delete "N(t) =" and insert therefor --$\hat{N}(t)$ =--;

UNITED STATES PATENT AND TRADEMARK OFFICE
CERTIFICATE OF CORRECTION

PATENT NO. : 4,630,264

DATED : December 16, 1986

INVENTOR(S) : Benjamin W. Wah and Jie-Yong Juang

It is certified that error appears in the above-identified patent and that said Letters Patent is hereby corrected as shown below:

At column 36, please delete the equation in claim 40 and insert therefor $$--\hat{N}(t) = \frac{B(t-1) \cdot K(t-1)}{W} --;$$

At column 37, please delete the equation in claim 47 and insert therefor $$--\hat{N}(t) = \frac{B(t-1) \cdot K(t-1)}{W} --; \text{ and}$$

At column 37, please delete line 25 and insert therefor $$--\text{if } X \epsilon S_j, Y \epsilon S_j \text{ and } i>j; \text{ then } X>Y--.$$

Signed and Sealed this

Eighth Day of March, 1988

Attest:

DONALD J. QUIGG

*Attesting Officer*  *Commissioner of Patents and Trademarks*